United States Patent
van Zelst et al.

(10) Patent No.: US 10,056,949 B2
(45) Date of Patent: Aug. 21, 2018

(54) TECHNIQUES FOR SUPPORTING MULTIPLE BANDWIDTH MODES

(71) Applicant: QUALCOMM Incorporated, San Diego, CA (US)

(72) Inventors: Albert van Zelst, Woerden (NL); Didier Johannes Richard van Nee, Tull en 't Waak (NL); Vincent Knowles Jones, IV, Redwood City, CA (US); Simon Jan Brand, Pleasanton, CA (US); Patrick Daniel Kelliher, Chelmsford, MA (US); MeeLan Lee, Los Altos, CA (US); Todd Daniel Antes, San Jose, CA (US); Maarten Menzo Wentink, Naarden (NL); Alireza Kheirkhahi, San Jose, CA (US); Ayse Yesilyurt, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 15/076,529

(22) Filed: Mar. 21, 2016

(65) Prior Publication Data

US 2016/0233931 A1 Aug. 11, 2016

Related U.S. Application Data

(63) Continuation-in-part of application No. 14/618,881, filed on Feb. 10, 2015.
(Continued)

(51) Int. Cl.
*H04B 7/0413* (2017.01)
*H04B 17/12* (2015.01)

(52) U.S. Cl.
CPC .......... *H04B 7/0413* (2013.01); *H04B 17/12* (2015.01)

(58) Field of Classification Search
CPC .............................. H04B 7/0413; H04B 17/12
See application file for complete search history.

(56) References Cited

U.S. PATENT DOCUMENTS 8,027,326 B2   9/2011   Shearer, III et al.
8,180,392 B2   5/2012   Sekiya et al.
(Continued)

FOREIGN PATENT DOCUMENTS

EP        2131618 A2    12/2009
WO   WO-2004057899 A1   7/2004
(Continued)

OTHER PUBLICATIONS

Pearson, "High-Speed, Analog-to-Digital Converter Basic," Application Report, Jan. 2011, 26 pgs., SLAA510, Texas Instruments Incorporated, Dallas, Texas.
(Continued)

*Primary Examiner* — Siming Liu
(74) *Attorney, Agent, or Firm* — Holland & Hart LLP/Qualcomm

(57) ABSTRACT

In an aspect a transceiver is provided. The transceiver may include a plurality of local oscillator (LO) generators configured to generate a plurality of LO signals, respectively, for mixing with one or more communication signals. The transceiver also includes a first synthesizer configured to generate a first reference signal and a second synthesizer configured to generate a second reference signal. The transceiver also includes a distribution circuit. The distribution circuit is configured to switch an input to at least one of the LO generators between the first and second reference signals for tuning each of the at least one of the LO generators between
(Continued)

two different LO frequencies and to input to the other ones of the LO generators the first reference signal for tuning each of the other ones of the LO generators to an LO frequency.

30 Claims, 23 Drawing Sheets

Related U.S. Application Data

(60) Provisional application No. 62/235,476, filed on Sep. 30, 2015.

(56) References Cited

U.S. PATENT DOCUMENTS

| | | | |
|---|---|---|---|
| 8,625,561 | B2 | 1/2014 | Zhang |
| 2006/0240816 | A1 | 10/2006 | Sutardja |
| 2010/0222007 | A1 | 9/2010 | Rao et al. |
| 2010/0303024 | A1 | 12/2010 | Gossain |
| 2012/0140646 | A1 | 6/2012 | Stephens |
| 2013/0010719 | A1 | 1/2013 | Shapira |
| 2013/0095816 | A1 | 4/2013 | Gerstenberger et al. |
| 2013/0171941 | A1 | 7/2013 | Kenney et al. |
| 2013/0194944 | A1 | 8/2013 | Soyak et al. |
| 2013/0336242 | A1 | 12/2013 | Rajagopal et al. |
| 2013/0336306 | A1 | 12/2013 | Sohn et al. |
| 2014/0050156 | A1 | 2/2014 | Chan et al. |
| 2014/0098748 | A1 | 4/2014 | Chan et al. |
| 2014/0226762 | A1 | 8/2014 | Maltsev et al. |
| 2014/0241335 | A1* | 8/2014 | Chen ................ H03L 7/093 370/342 |
| 2014/0254494 | A1 | 9/2014 | Clegg |
| 2014/0378179 | A1 | 12/2014 | Nagai et al. |
| 2015/0271829 | A1 | 9/2015 | Amini et al. |
| 2015/0373587 | A1 | 12/2015 | Josiam et al. |
| 2016/0081089 | A1 | 3/2016 | Suzuki |
| 2016/0233929 | A1 | 8/2016 | Van Zelst et al. |
| 2016/0249357 | A1 | 8/2016 | Green et al. |

FOREIGN PATENT DOCUMENTS

| | | |
|---|---|---|
| WO | WO-2010138290 A1 | 12/2010 |
| WO | WO2014048801 A1 | 4/2014 |

OTHER PUBLICATIONS

IEEE, "Local and Metropolitan Area Networks—Amendment 4: Enhancements," IEEE Xplore, Dec. 2013, pp. 104 & 113, Std 802.11ac-2013, Institute of Electrical and Electronics Engineers.

ISA/EPO, International Search Report and Written Opinion of the International Searching Authority, Int'l App. No. PCT/US2016/012598, dated Apr. 6, 2016, European Patent Office, Rijswijk, NL, 13 pgs.

Park, "IEEE 802.11ac: Dynamic Bandwidth Channel Access," 2011 IEEE International Conference on Communications (ICC), Kyoto, Jun. 5-9, 2011, 5 pgs., XP_31908841A, Institute of Electrical and Electronics Engineers.

Rajagopal, "Power Efficiency: The Next Challenge for Multi-Gigabit-Per-Second Wi-Fi", Future of Wi-Fi, IEEE Communications Magazine, vol. 52, Issue 11, Nov. 2014, pp. 40-45, XP_11564612A, Institute of Electrical and Electronics Engineers.

\* cited by examiner

TECHNIQUES FOR SUPPORTING MULTIPLE BANDWIDTH MODES

CROSS REFERENCES

The present Application is a continuation-in-part of U.S. patent application Ser. No. 14/618,881 by van Zelst et al., entitled "Techniques for Supporting Multiple Bandwidth Modes," filed Feb. 10, 2015, assigned to the assignee hereof, and expressly incorporated by reference herein. The present Application also claims priority to U.S. Provisional Patent Application No. 62/235,476, entitled "Per-Packet Local Oscillator Switching and Phase Alignment," filed Sep. 30, 2015, assigned to the assignee hereof, and expressly incorporated by reference herein.

BACKGROUND

Field of the Disclosure

The present disclosure, for example, relates to wireless communication systems, and more particularly to wireless devices capable of supporting multiple bandwidth modes.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

A wireless network may define multiple bandwidth modes specifying the bandwidth of channels used by wireless devices (e.g., 20 MHz, 40 MHz, 80 MHz, etc.) to communicate over the network. Some networks may permit the combination of multiple channels using channel bonding to allow for operation over a bandwidth that is larger than that of a single channel. Because some wireless devices may switch between these bandwidth modes, there is a need to efficiently leverage hardware in a wireless device to provide support for multiple bandwidth modes. Additionally, as the number and type of bandwidth modes supported by wireless devices increases, there is a need to provide support for new bandwidth modes while maintaining backwards compatibility with legacy bandwidth modes. Further, there is a need to increase bandwidth and throughput of wireless communications channels to support better communications between devices. This may require improvements in hardware and software of devices, such as switching between operating frequencies.

SUMMARY

The present disclosure is directed to techniques, devices, and systems for supporting bandwidth modes utilizing channel bonding while also providing backwards compatibility with legacy bandwidth modes. Specifically, a wireless device may advertise support for a first bandwidth mode that utilizes a single channel and a second bandwidth mode that utilizes channel bonding between multiple channels (e.g., channel bonding of two 80 MHz channels to operate over 160 MHz of total bandwidth). When the wireless device switches from one of the bandwidth modes to the other of the bandwidth modes, the wireless device may adjust a number of multiple-input, multiple-output (MIMO) spatial streams supported by the wireless device in response to the switching.

If the second bandwidth mode has a total bandwidth that is n times greater than the first bandwidth mode, with n being a positive integer, switching from the first bandwidth mode to the second bandwidth mode may involve reducing the number of MIMO spatial streams supported by the wireless device by 1/n. Similarly, switching from the second bandwidth mode to the first bandwidth mode may involve increasing the number of MIMO spatial streams supported by the wireless device by a factor of n. Using this technique and others described herein, support for the second bandwidth mode can be provided without, or with only modest, increases in the number of hardware components or complexity of the circuits in the wireless device beyond what is used to support the first bandwidth mode.

A transceiver is described. The transceiver includes a plurality of local oscillator (LO) generators configured to generate a plurality of LO signals, respectively, for mixing with one or more communication signals, a first synthesizer configured to generate a first reference signal, a second synthesizer configured to generate a second reference signal and a distribution circuit configured to switch an input to at least one of the LO generators between the first and second reference signals for tuning each of the at least one of the LO generators between two different LO frequencies, and to input to the other ones of the LO generators the first reference signal for tuning each of the other ones of the LO generators to an LO frequency.

An apparatus for wireless communication is described. The apparatus includes means for generating a plurality of LO signals, respectively, for mixing with one or more communication signals, means for generating a first reference signal, means for generating a second reference signal, means for switching an input to at least one of the LO generators between the first and second reference signals for tuning each of the at least one of the LO generators between two different LO frequencies, and means for inputting to the other ones of the LO generators the first reference signal for tuning each of the other ones of the LO generators to an LO frequency.

In some examples of the transceiver and apparatus described above, a phase alignment circuit is configured to phase align the LO signals generated by the LO generators receiving the first reference signal. The phase alignment circuit can be further configured to phase align the LO signals generated by the LO generators receiving the second reference signal. A phase detection circuit can be configured to provide a phase control signal to each of the LO generators. In some cases, the phase detection circuit is further configured to generate the phase control signal based on the LO signals. The phase detection circuit can also be further configured to generate the phase control signal based on relative phases of the LO signals generated by the LO generators receiving the first reference signal.

The at least one of the LO generators can be two or more LO generators, and the phase detection circuit can generate the phase control signal based further on relative phases of the LO signals generated by the LO generators receiving the second reference signal. The distribution circuit can include a set of serially coupled circuit elements, with each of the circuit elements having an output for providing the input to a corresponding one of the LO generators.

Each of the circuit elements can include a transconductance amplifier. The distribution circuit can include a switching circuit configured to switch the first and second reference signals to one or more of the circuit elements providing the inputs to the at least one of the LO generators.

A method of wireless communication is described. The method includes generating, at a plurality of local oscillator (LO) generators, a plurality of LO signals for mixing with one or more communication signals, generating a first reference signal with a first synthesizer, generating a second reference signal with a second synthesizer, switching an input to at least one of the plurality of LO generators between the first reference signal and the second reference signal for tuning at least one of the plurality of LO generators between two different LO frequencies and inputting, to at least one other of the plurality of LO generators, the first reference signal for tuning the at least one other of the plurality of LO generators to an LO frequency.

An apparatus for wireless communication is described. The apparatus includes means for generating, at a plurality of local oscillator (LO) generators, a plurality of LO signals for mixing with one or more communication signals, means for generating a first reference signal with a first synthesizer, means for generating a second reference signal with a second synthesizer, means for switching an input to at least one of the plurality of LO generators between the first reference signal and the second reference signal for tuning at least one of the plurality of LO generators between two different LO frequencies and means for inputting, to at least one other of the plurality of LO generators, the first reference signal for tuning the at least one other of the plurality of LO generators to an LO frequency.

A further apparatus is described. The apparatus includes a processor, memory in electronic communication with the processor, and instructions stored in the memory. The instructions may be operable to cause the processor to generate, at a plurality of local oscillator (LO) generators, a plurality of LO signals for mixing with one or more communication signals, generate a first reference signal with a first synthesizer, generate a second reference signal with a second synthesizer, switch an input to at least one of the plurality of LO generators between the first reference signal and the second reference signal for tuning at least one of the plurality of LO generators between two different LO frequencies and inputting, to at least one other of the plurality of LO generators, the first reference signal for tuning the at least one other of the plurality of LO generators to an LO frequency.

A non-transitory computer readable medium for wireless communication is described. The non-transitory computer-readable medium includes instructions to cause a processor to generate, at a set of local oscillator (LO) generators, a set of LO signals for mixing with one or more communication signals, generate a first reference signal with a first synthesizer, generate a second reference signal with a second synthesizer, switch an input to at least one of the set of LO generators between the first reference signal and the second reference signal for tuning at least one of the set of LO generators between two different LO frequencies and inputting, to at least one other of the set of LO generators, the first reference signal for tuning the at least one other of the set of LO generators to an LO frequency.

In some examples of the method, apparatuses, or non-transitory computer-readable medium described above the LO signals generated by the LO generators receiving the first reference signal are phase aligned. The LO signals generated by the LO generators receiving the second reference signal can also be phase aligned.

A phase control signal is in some cases provided to each of the set of LO generators. The phase control signal can be generated based at least in part on the LO signals. For example, the phase control signal is generated based on relative phases of the LO signals generated by the LO generators receiving the first reference signal. The at least one of the set of LO generators can be two or more LO generators, and the phase control signal can be generated based further on relative phases of the LO signals generated by the LO generators receiving the second reference signal.

An output from at least one of a set of serially coupled circuit elements can be input to a corresponding LO generator of the set of LO generators. At least one of the circuit elements can be a transconductance amplifier.

In some cases, the first reference signal and the second reference signal are switched to one or more of the set of serially coupled circuit elements providing the inputs to the at least one of the set of LO generators.

A wireless communication apparatus is described. The apparatus includes a transceiver comprising a plurality of local oscillator (LO) generators configured to generate a plurality of LO signals, respectively, for mixing with one or more communication signals, at least one of the LO generators being switchable between two different LO frequencies, wherein at least two of the LO generators are phase-aligned to mix with the one or more communication signals and a processor configured to process a plurality of data packets to provide the one or more communication signals to the LO generators, the processor further being configured to switch the at least one of the LO generators between the two different LO frequencies on a packet-by-packet basis based on information included in each packet.

An apparatus for wireless communication is described. The apparatus includes means for a transceiver comprising a plurality of local oscillator (LO) generators configured to generate a plurality of LO signals, respectively, for mixing with one or more communication signals, at least one of the LO generators being switchable between two different LO frequencies, wherein at least two of the LO generators are phase-aligned to mix with the one or more communication signals and means for a processor configured to process a plurality of data packets to provide the one or more communication signals to the LO generators, the processor further being configured to switch the at least one of the LO generators between the two different LO frequencies on a packet-by-packet basis based on information included in each packet.

In some examples, the processor is further configured to provide a phase control signal to the set of LO generators. The processor can be further configured to generate the phase control signal based on the LO signals or relative phases of the LO signals generated by the LO generators receiving a first reference signal.

The transceiver can include a set of serially coupled circuit elements in electronic communication with the set of LO generators. At least one of the circuit elements may be a transconductance amplifier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In accordance with common practice, some of the drawings may be simplified for clarity. Thus, the drawings may not depict all of the components of a given apparatus (e.g., device) or method. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
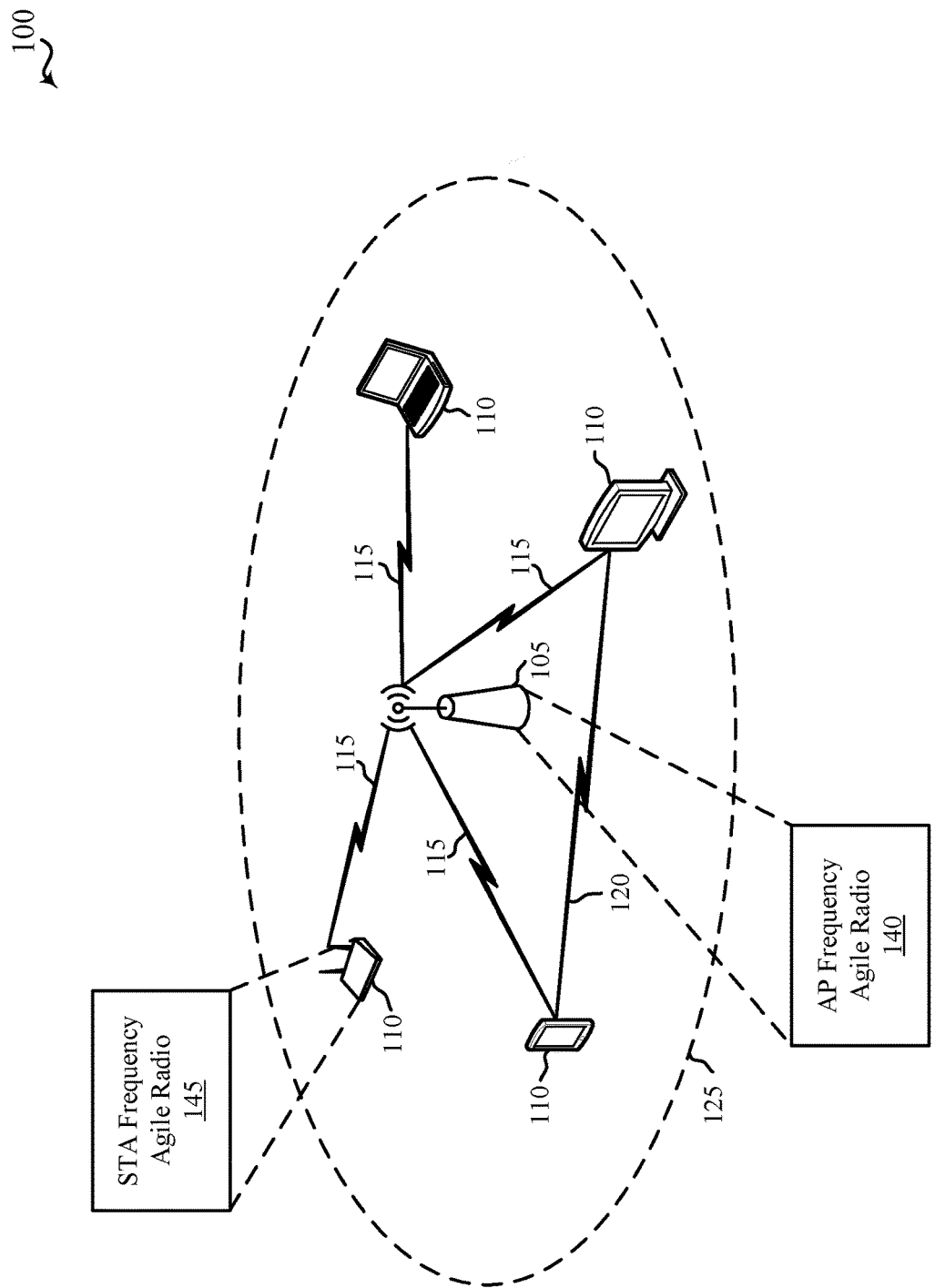
FIG. 1 shows a diagram of a wireless communication system, in accordance with various aspects of the present disclosure.

A wireless device may communicate using multiple bandwidth modes. New wireless devices and wireless protocols may be capable of using different bandwidths that previously were not used. Techniques, devices, and systems described herein provide support for additional bandwidth modes while also providing backwards compatibility for legacy bandwidth modes.

The present disclosure is directed to techniques, devices, and systems for supporting bandwidth modes utilizing channel bonding while also providing backwards compatibility with legacy bandwidth modes. Specifically, a wireless device may advertise support for a first bandwidth mode that utilizes a single channel and a second bandwidth mode that utilizes channel bonding between multiple channels (e.g., channel bonding of two 80 MHz channels to operate over 160 MHz of total bandwidth). When the wireless device switches from one of the bandwidth modes to the other of the bandwidth modes, the wireless device may adjust a number of multiple-input, multiple-output (MIMO) spatial streams supported by the wireless device in response to the switching.

For example, if the second bandwidth mode has a total bandwidth that is n times greater than the first bandwidth mode, with n being a positive integer, switching from the first bandwidth mode to the second bandwidth mode may involve reducing the number of MIMO spatial streams supported by the wireless device by 1/n. Similarly, switching from the second bandwidth mode to the first bandwidth mode may involve increasing the number of MIMO spatial streams supported by the wireless device by a factor of n. Using this technique and others described herein, support for the second bandwidth mode may be provided without increasing the number of hardware components or complexity of the circuits in the wireless device beyond what is used to support the first bandwidth mode. In other examples, support for the second bandwidth mode may be achieved using techniques described herein with minor increases to the number of hardware components or circuit complexity.

Three options are described herein for a wireless device to support an additional 160 MHz bandwidth mode using two spatial streams while supporting 20, 40, and 80 MHz bandwidth modes. The wireless device may also support an 80+80 MHz and a 165 MHz bandwidth mode. The wireless device may utilize channel bonding in order to combine smaller segments (e.g., 80 MHz) into a larger (e.g., 160 MHz) channel. In a first option, a synthesizer for each segment is used in the one or more transceivers to combine two segments into a larger segment. In a second option, two analog-to-digital converters (ADCs) are used in the radio frequency (RF) chains at a different sampling rate in order to create a larger channel. In one example, the sampling rate of the ADCs is doubled (e.g., 160 is doubled to 320 Msps). In a third option, two synthesizers and increased ADC speeds may be used.

Throughout this description, the bandwidth modes supported by the IEEE 802.11ac standard are discussed as an example. However, the techniques and devices described herein may extend to other standards and other bandwidths. The IEEE 802.11ac standard defines a 160 MHz bandwidth mode consisting of two 80 MHz sub-channels (i.e., frequency segments) where each sub-channel has the same number of tones and pilots as a single 80 MHz 11ac channel. Other bandwidth modes supported by the IEEE 802.11ac standard include a 20 MHz bandwidth mode, a 40 MHz bandwidth mode, and an 80 MHz bandwidth mode. As used throughout the description, a wireless device may refer to either an access point or a wireless device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing at least one of the IEEE 802.11 family of standards. The WLAN network 100 may include an access point (AP) 105 and one or more wireless devices 110 or stations (STAs), such as mobile stations, personal digital assistants (PDAs), other handheld devices, netbooks, notebook computers, tablet computers, laptops, display devices (e.g., TVs, computer monitors, etc.), printers, and the like. While only one AP 105 is illustrated, the WLAN network 100 may have multiple APs 105. Each of the wireless devices 110, which may also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile. The principles of the present disclosure are described in the context of wireless systems for the purpose of illustration. Nevertheless, it will be understood that these principles are not necessarily limited to wireless systems, and can also be implemented in devices and systems configured to communicate over wired connections.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up only a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, and other P2P group connections. The wireless devices 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, and the like. In other implementations, other peer-to-peer connections and/or ad hoc networks may be implemented within WLAN network 100.

The AP 105 may include an AP frequency agile radio 140. A frequency agile radio is a transceiver that can dynamically change bandwidth modes. The bandwidth modes may utilize different frequency channels, and may include an 80 MHz mode, an 80+80 MHz mode, a 160 MHz contiguous mode, and a 165 MHz mode. In other examples, other bandwidth modes may be used. The AP 105 may communicate with the wireless devices 110 or other APs over different bandwidths using the AP frequency agile radio 140.

At least one of the wireless devices 110 may also include a station frequency agile radio 145. The STA frequency agile radio 145 can also dynamically change bandwidth modes to communicate with another wireless device 110 or the AP 105 over a selected bandwidth mode. The selected bandwidth mode may be, for example, the 80 MHz mode, the 80+80 MHz mode, the 160 MHz mode, and the 165 MHz mode. In other examples, the STA frequency agile radio 145 may use other bandwidth modes.

In some examples, the AP frequency agile radio 140 and the STA frequency agile radio 145 may conform to the second release of the 802.11ac standard. The AP frequency agile radio 140 and the STA frequency agile radio 145 may also be backwards compatible with the first release of the 802.11ac standard.

Several different options are described herein for achieving channel bonding to create a larger segment out of two smaller segments. In one option, the wireless device may use synthesizers (e.g., one synthesizer for each receive chain or a set of receive chains tuned to the same segment) to combine two 80 MHz segments into a two spatial stream 80+80 MHz segment. In another option, the wireless device may have increased sampling rates of one or more ADCs to capture the entire 160 MHz channel. Alternatively, the wireless device may use a combination of synthesizers and increased sampling rates of ADCs in order to have a larger bandwidth, including the 80+80 as well as the 160 MHz segments.

Figure 2:
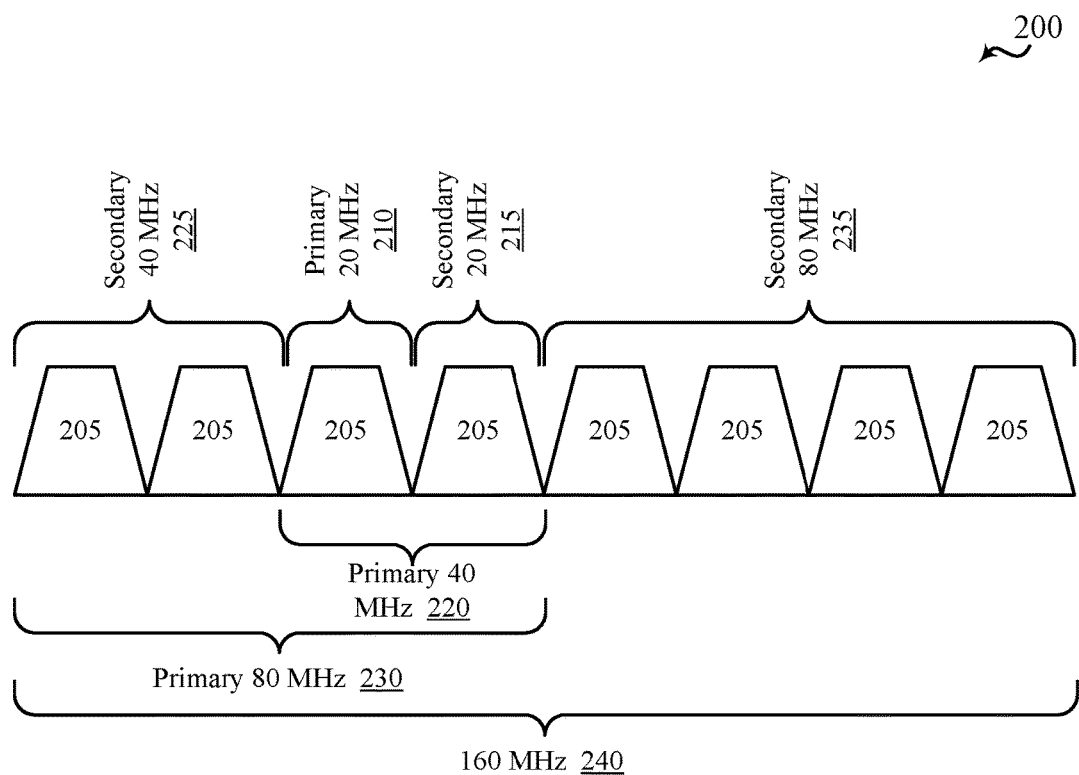
FIG. 2 shows a conceptual diagram of an example channelization for a wireless communication system, in accordance with various aspects of the present disclosure.

FIG. 2 shows a conceptual diagram of an example channelization 200 for a wireless communication system, in accordance with various aspects of the present disclosure. The channelization 200 may define the available channels for the wireless communication. In this example, the wireless communication system may be between any combination of APs 105 and wireless devices 110 described with reference to FIG. 1. That is, an AP 105 or a wireless device 110 may use the channelization 200 for wireless communications.

In the example of FIG. 2, the channelization 200 includes eight 20 MHz sub-channels 205. The channelization 200 may include a primary 20 MHz channel 210, a secondary 20 MHz channel 215, a primary 40 MHz channel 220, a secondary 40 MHz channel 225, a primary 80 MHz channel 230, and a secondary 80 MHz channel 235. Typically in 802.11ac, an AP 105 selects a channel bandwidth, such as 80 MHz, and when wireless devices 110 connect to the AP 105, the use of sub-channels may be as follows: a 20 MHz wireless device 110 will communicate with the AP 105 over the primary 20 MHz channel 215; a 40 MHz wireless device 110 will communicate with the AP 105 over the primary 20 MHz channel 215 when sending 20 MHz packets and over the primary 40 MHz channel 220 when sending 40 MHz packets; an 80 MHz wireless device 110 will communicate with the AP 105 over the primary 20 MHz channel 215 when sending 20 MHz packets, over the primary 40 MHz channel 220 when sending 40 MHz, and over the primary 80 MHz channel 230 when sending 80 MHz packets.

However, devices and techniques described herein support a channelization 200 also having a 160 MHz channel 240. The 160 MHz channel 240 may include all eight 20 MHz sub-channels 205. The 160 MHz channel 240 may include both of the 80 MHz channels 230, 235. When the 160 MHz channel 240 is selected, the AP 105 or the wireless device 110 may communicate using 160 MHz. The 160 MHz channel 240 may use a simple extension to the channel access rules applicable for 80 MHz channels 230, 235. Channel bonding may be used to combine sub-channels into larger channels, such as the 160 MHz channel 240.

The sub-channels 205 may be contiguous in frequency or may be separated in frequency. In some examples, two or more smaller channels (i.e., frequency segments) that are discontiguous (i.e., separated by a frequency gap) may be combined to create a larger channel, via a frequency synthesizer, for example. An example of this includes a 160 MHz channel made out of two 80 MHz channels, such as the primary 80 MHz channel 230 and the secondary 80 MHz channel 235, where the 80 MHz channels 230, 235 are separated by a frequency gap. Such a 160 MHz channel may be referred to as an 80+80 channel.

The channels 205-240 may be used with different numbers of spatial streams (ss), depending on how many spatial streams the AP 105 or wireless device 110 supports. For example, the primary 80 MHz channel 230 may be used with two or four spatial streams. Likewise, the secondary 80 MHz channel 235 may be used with two or four spatial streams. The 160 MHz channel 240 may use one or two spatial streams. Similarly, the 80+80 channel may use two spatial streams.

The example of FIG. 2 illustrates specific 20 MHz sub-channels 205 being used for each of the bandwidth modes. However, in other examples, sub-channels with bandwidths other than 20 MHz may be used to make up the various bandwidth modes. An AP 105 may select which sub-channels 205 to use as a primary channel. The primary channel may be used as a control channel and for the lowest bandwidth transmissions. In some examples, as long as the primary channel is defined, the other sub-channels will be known by the AP 105 and the wireless devices 110 in communication with the AP 105.

Figure 3:
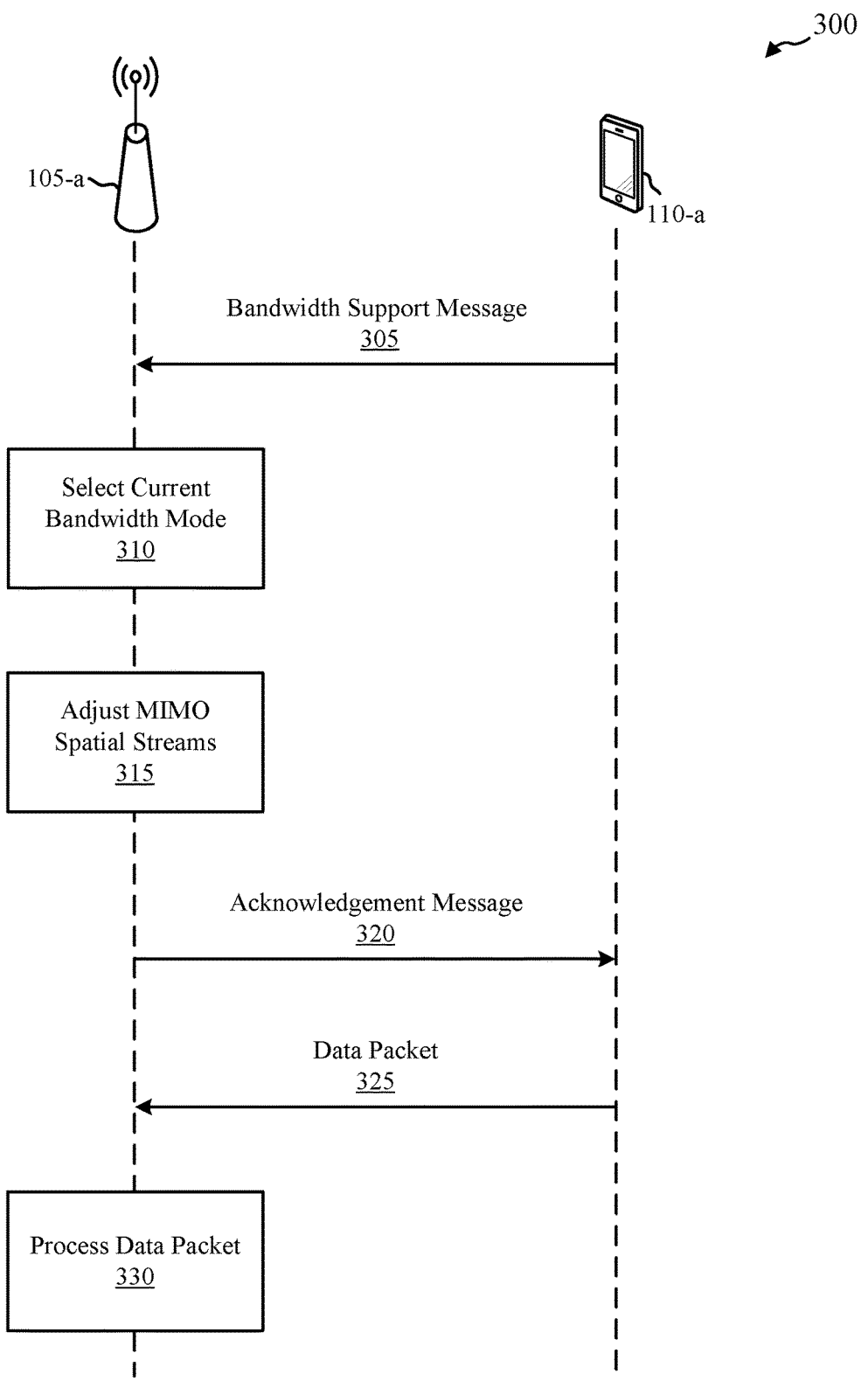
FIG. 3 shows a flow diagram illustrating an example bandwidth mode selection in a wireless communication system, in accordance with various aspects of the present disclosure.

FIG. 3 shows a flow diagram illustrating an example bandwidth mode selection in a wireless communication system 300, in accordance with various aspects of the present disclosure. In this example, an access point 105-*a* selects a current bandwidth mode based on a bandwidth of a wireless device 110-*a*. The access point 105-*a* may be an example of one or more aspects of the AP 105 described with reference to FIG. 1. Similarly, the wireless device 110-*a* may be an example of one or more aspects of the wireless devices 110 described with reference to FIG. 1.

The wireless device 110-*a* transmits a bandwidth support message 305 to the AP 105-*a* when the wireless device 110-*a* wishes to communicate with the AP 105-*a*. The bandwidth support message 305 may advertise support by the wireless device 110-*a* for at least a first bandwidth mode and a second bandwidth mode. For example, the bandwidth support message 305 may advertise that the wireless device 110-*a* may support an 80 MHz bandwidth mode and a 160 MHz bandwidth mode. In some examples, the bandwidth support message 305 may identify that the wireless device 110-*a* supports the 160 MHz bandwidth mode, and may be presumed to also support a second bandwidth mode, such as the 80 MHz bandwidth mode. In some examples, the bandwidth identification message 310 may identify a selected bandwidth that the wireless device 110-*a* intends to use. In some examples, the wireless device 110-*a* may send the bandwidth identification message 310 in response to receiving a signal from the AP 105-*a*.

The AP 105-*a* may determine a bandwidth mode to use to communicate with the wireless device 110-*a* based at least in part on a bandwidth mode identified as supported in the received bandwidth support message 305. If the AP 105-*a* supports the identified bandwidth mode, the AP 105-*a* selects a current bandwidth mode to be the identified bandwidth mode at block 310. The AP 105-*a* may restrict communications with the wireless device 110-*a* to only those modes identified as supported by the wireless device 110-*a*. The AP 105-*a* may communicate using other bandwidth modes with other wireless devices 110 associated with the AP 105-*a*. However, the AP 105-*a* may not exceed a current channel bandwidth selected for the BSS of which the AP 105-*a* is a part.

If needed, the AP 105-*a* may adjust the number of MIMO spatial streams used for the selected current bandwidth mode at block 315. For example, the AP 105-*a* may adjust the number of MIMO spatial streams used to two or four spatial streams dedicated to the current bandwidth mode.

In some examples, the AP 105-*a* may send an acknowledgment message 320 to the wireless device 110-*a* that informs the wireless device 110-*a* of the bandwidth mode to use to communicate with the AP 105-*a*. For example, the acknowledgment message 320 may indicate that the wireless device 110-*a* may operate in the identified bandwidth mode identified in the bandwidth support message 305. In other examples, the AP 105-*a* does not send the acknowledgement message 320.

The wireless device 110-*a* may send one or more data packets 325 over the current bandwidth mode to the AP 105-*a*. For example, the one or more data packets 325 may be sent using a 160 MHz channel if that is the channel that is currently being used. The AP 105-*a* may process the one or more data packets at block 330. The AP 105-*a* and the wireless device 110-*a* may support per-packet switching. That is, depending on medium availability, the AP 105-*a* may choose a bandwidth mode from packet to packet. For example, the AP 105-*a* may select to use the 80 MHz channel bandwidth (e.g., with a maximum of up to four spatial streams) for a first packet and then may switch to another bandwidth mode, such as the 80+80 MHz (e.g., with a maximum of up to two spatial streams).

FIG. 3 is illustrated as the AP 105-*a* announcing the bandwidth capabilities and selecting a current bandwidth mode. However, in other examples, the wireless device 110-*a* may perform the role attributed to the AP 105-*a* in FIG. 3. Similarly, the AP 105-*a* may send a bandwidth identification message to the wireless device 110-*a* or to another AP 105.

Figure 4:
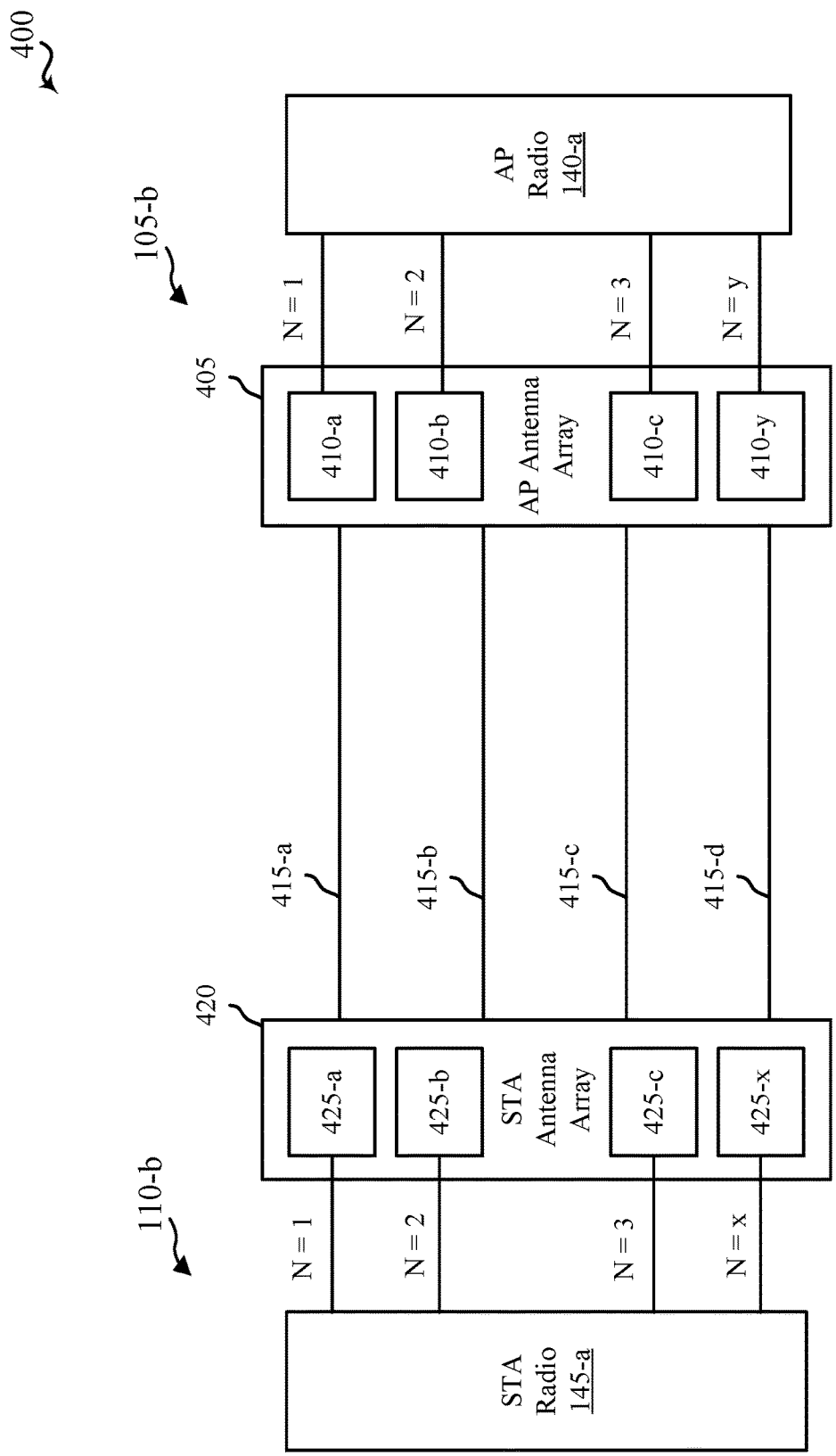
FIG. 4 shows a conceptual diagram of an example wireless communication system operating with four spatial streams, in accordance with various aspects of the present disclosure.

FIG. 4 shows a conceptual diagram of an example wireless communication system 400 operating with four spatial streams 415-*a*, 415-*b*, 415-*c*, and 415-*d* (collectively referred to herein as "spatial streams 415"), in accordance with various aspects of the present disclosure. A wireless device 110-*b* communicates with an access point 105-*b* over the spatial streams 415 according to a current bandwidth mode. The access point 105-*b* may be an example of one or more aspects of the AP 105 described with reference to FIGS. 1 and 3. The wireless device 110-*b* may be an example of one or more aspects of the wireless devices 110 described with reference to FIGS. 1 and 3.

The wireless device 110-*b* includes a station frequency agile radio 145-*a* and a STA antenna array 420. The STA frequency agile radio 145-*a* may be an example of one or more aspects of the STA frequency agile radio 145 of FIG. 1. The STA antenna array 420 may include a number, x, of antennas, including antennas 425-*a*, 425-*b*, 425-*c*, up to 425-*x*, wherein x can be any number of supported antennas. The wireless device 110-*b* also includes x number of receive chains N. For example, a receive chain N=1 is coupled to the antenna 425-*a*, a receive chain N=2 is coupled to the antenna 425-*b*, a receive chain N=3 is coupled to the antenna 425-*c*, and a receive chain N=x is coupled to the antenna 425-*x*.

Similarly, the AP 105-*b* includes an AP radio 140-*a* and an AP antenna array 405. The AP radio 140-*a* may be an example of one or more aspects of the AP frequency agile radio 140 of FIG. 1. The AP antenna array 405 may include a number, y, of antennas 410, including antennas 410-*a*, 410-*b*, 410-*c*, up to 410-*y*, wherein y can be any number of supported antennas. The AP 105-*b* also includes y number of receive chains N. For example, a receive chain N=1 is coupled to the antenna 410-*a*, a receive chain N=2 is coupled to the antenna 410-*b*, a receive chain N=3 is coupled to the antenna 410-*c*, and a receive chain N=y is coupled to the antenna 410-*y*. The numbers x and y may be the same number or different numbers.

The wireless device 110-*b* communicates with the AP 105-*b* over the four spatial streams 415. The wireless device 110-*b* and the AP 105-*b* may use the spatial streams for one or more channels. For example, the AP 105-*b* and the wireless device 110-*b* may use the 4 spatial streams for an 80 MHz channel for multi-user MIMO. In some examples, the four spatial steams may be used for different channel combinations. The wireless device 110-*b* and the AP 105-*b* may also have a channel for listening.

Figure 5:
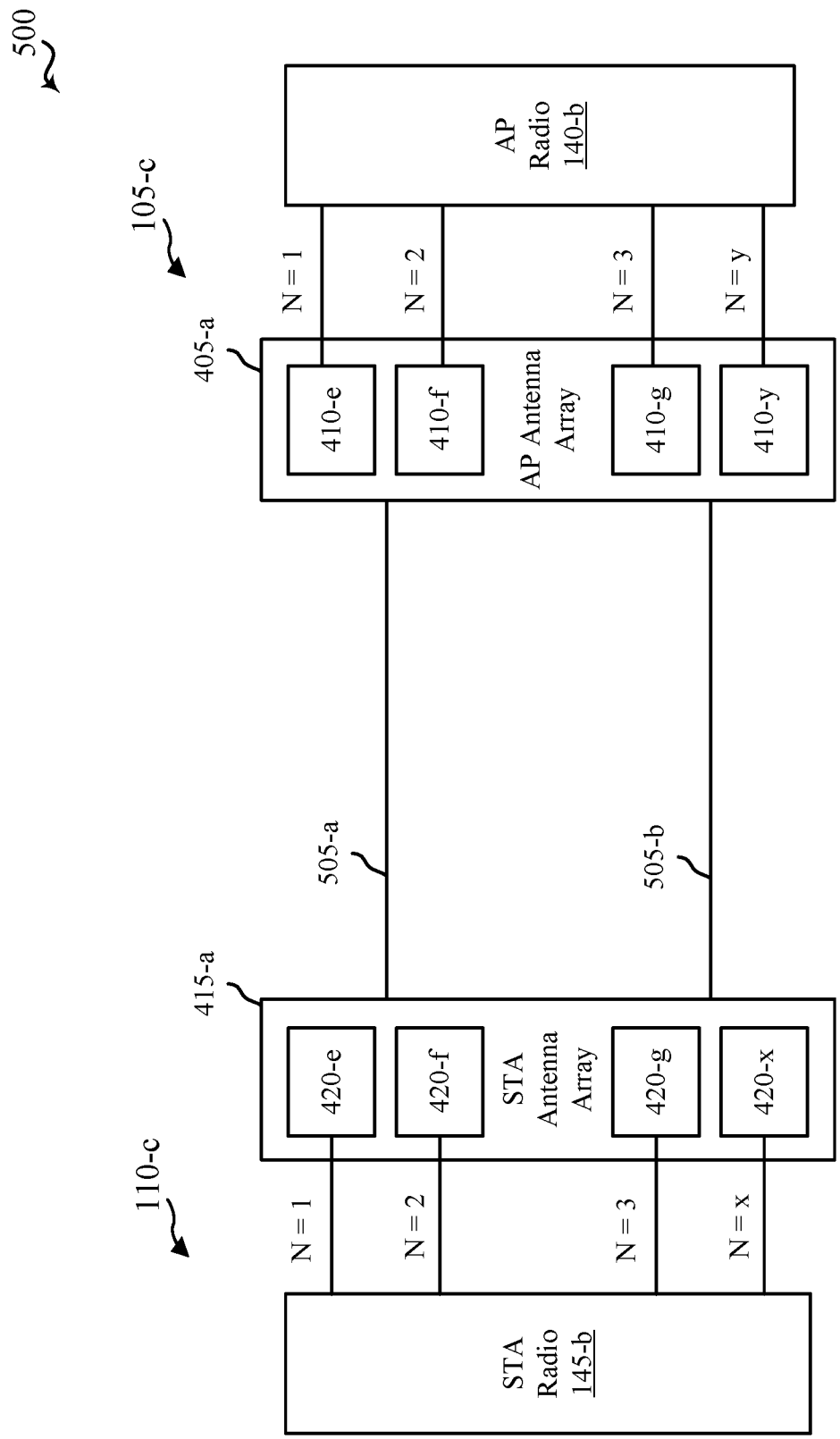
FIG. 5 shows a conceptual diagram of an example wireless communication system operating with two spatial streams, in accordance with various aspects of the present disclosure.

FIG. 5 shows a conceptual diagram 500 of an example wireless communication system operating with two spatial streams 505-*a* and 505-*b* (collectively referred to herein as "spatial streams 505"), in accordance with various aspects of the present disclosure. A wireless device 110-*c* communicates with an access point 105-*c* over the spatial streams 505 according to a current bandwidth mode. The access point 105-*c* may be an example of one or more aspects of the AP 105 described with reference to FIGS. 1 and 3-4. The wireless device 110-*c* may be an example of one or more aspects of the wireless devices 110 described with reference to FIGS. 1 and 3-4.

The wireless device 110-*c* includes a station frequency agile radio 145-*b* and a STA antenna array 420-*a*. The STA frequency agile radio 145-*b* may be an example of one or more aspects of the STA frequency agile radio 145 of FIGS. 1 and 4. The STA antenna array 420 may be an example of one or more aspects of the STA antenna array 420 of FIG. 4. The STA antenna array 420-*a* may include a number, x, of antennas 425, including antennas 425-*e*, 425-*f*, 425-*g*, up to 425-*x*, wherein x can be any number of supported antennas. The wireless device 110-*c* also includes x number of receive chains N.

Similarly, the AP 105-*c* includes an AP radio 140-*b* and an AP antenna array 405-*a*. The AP radio 140-*b* may be an example of one or more aspects of the AP frequency agile radio 140 of FIGS. 1 and 4. The AP antenna array 405-*a* may be an example of one or more aspects of the AP antenna array 405 of FIG. 4. The AP antenna array 405-*a* may include a number, y, of antennas 410, including antennas 410-*e*, 410-*f*, 410-*g*, up to 410-*y*, wherein y can be any number of supported antennas. The AP 105-*b* also includes y number of receive chains N.

The wireless device 110-*c* communicates with the AP 105-*c* over the two spatial streams 505. The wireless device 110-*c* and the AP 105-*c* may use the spatial streams for one or more channels. The number of spatial streams that the wireless device 110-*c* and the AP 105-*c* use may depend on the current bandwidth mode. For example, the AP 105-*c* and the wireless device 110-*c* may use the two spatial streams 505 for a 160 MHz channel. In examples where the wireless device 110-*c* and the AP 105-*c* may communicate over two or four spatial streams, four spatial streams in 80 MHz and two spatial streams in 160 MHz may be used by dedicating two chains to the lower 80 MHz segment and two chains to the upper 80 MHz segment.

In some examples, the AP 105-*c* and the wireless device 110-*c* may advertise support for different bandwidth modes by signaling a response frame including an operating mode notification (OMN) element. An OMN element transmitted by the AP 105-*c* may indicate, for example, that the AP 105-*c* is using the 80 MHz bandwidth mode or the 160 MHz bandwidth mode. The OMN element may also indicate a number of MIMO spatial streams supported by the AP 105-*c*. In some examples, including an OMN element in an association response frames does not imply that an OMN element needs to also be included in a beacon. This allows the OMN element to be targeted to a specific client wireless device instead of all client wireless devices if the OMN element were included in a beacon.

In some examples, the AP 105-*c* may support 4 spatial stream 80 MHz and 2 spatial stream 160 MHz at the same time. In such an example, the AP 105-*c* can transmit an operating mode notification (OMN) element in one or more association response frames to a 3 or 4 spatial stream 160 MHz supporting wireless device, such as the wireless device 110-*c*. For example, the AP 105-*c* may advertises itself as 4 ss/160 MHz, but may avoid the use of 3-4 ss/160 MHz modulation and coding schemes (MCSs) by setting the operating bandwidth to 80 MHz at 3-4 ss/160 clients, using the OMN element. In another example, the AP 105-c may avoid the use of 3 ss and 4 ss 160 MHz MCSs by using the OMN to set a maximum allowed number of spatial streams to two for wireless devices 110 that support 3 and 4 ss 160 MHz. This could be done in combination with an indication of a maximum data rate. Otherwise, a maximum data rate can be inferred. For example, the AP 105-c may set a maximum data rate of 1560 Mbps, otherwise the inferred maximum rate of the AP 105-c may be 3.5 Gbps. In other examples, other maximum data rates may be set or inferred.

In some examples, an OMN element may be mandatory on the receiver side for a Wi-Fi 802.11ac certification. In some examples, the AP 105-c may alternatively create dual BSSs (with dual beacons). One BSS may use a 4 ss/80 MHz bandwidth mode while the other BSS may use a 2 ss/160 MHz bandwidth mode, for example. The two BSSs may use the same BSSID.

Figure 6:
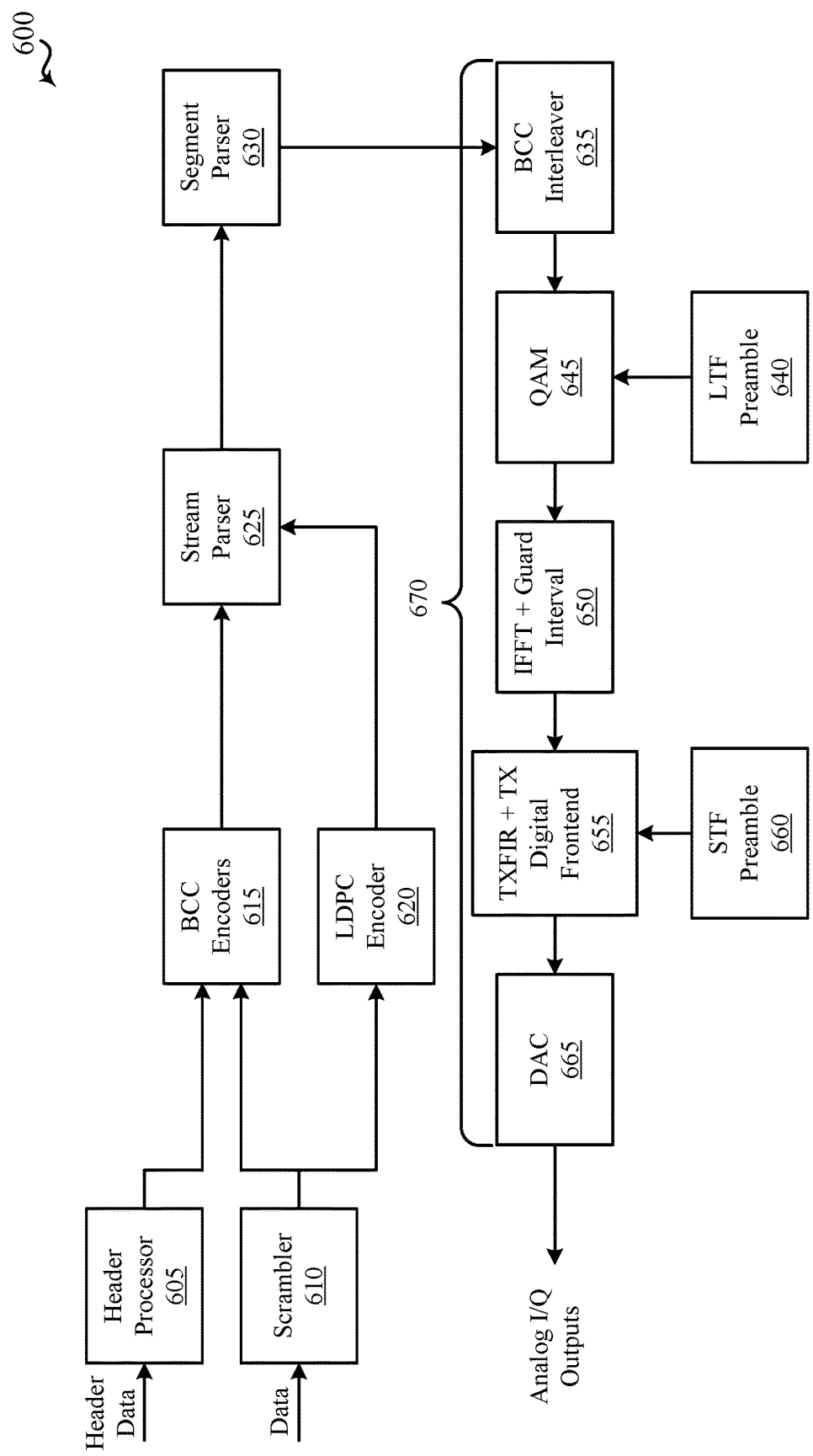
FIG. 6 shows a block diagram of an example digital portion of a physical layer of a transmitter, in accordance with various aspects of the present disclosure.

FIG. 6 shows a block diagram of an example digital portion of a physical layer of a transmitter 600, in accordance with various aspects of the present disclosure. The transmitter 600 may be included in an access point 105 or a wireless device 110, which may be an example of one or more aspects of the AP 105 or wireless device 110 described with reference to FIGS. 1 and 3-5, respectively. The components included in the transmitter 600 illustrate merely one example. In other examples, other components of the transmitter 600 may be used.

The transmitter 600 may receive, as inputs, header data into a header processor 605 and data into a scrambler 610. The header data may include control or other information for the data. The header processor 605 may interpret or otherwise process the header data and provide it to one or more BCC encoders 615. The scrambler 610 may scramble (e.g., invert or encode) the data, in the analog or digital domain. The scrambler 610 may provide the scrambled data to the one or more binary convolutional code (BCC) encoders 615 and a low-density parity check (LDPC) encoder 620.

The BCC encoder 615 and the LDPC encoder 620 may encode the scrambled data or the header data and provide the encoded data to a stream parser 625. The stream parser 625 may divide the received data into individual streams or segments. For example, the stream parser 625 may divide the received data into two streams for a 160 MHz bandwidth mode. The stream parser 625 may forward the divided data to a segment parser 630.

The segment parser 630 may divide bits of the received data between the two segments. An example functionality of the segment parser 630 is as follows. Per stream parser 625 output, the segment parser 630 takes blocks of $N_{CBPSS}$ bits (i.e., coded bits per symbol per spatial stream) and may divide them over the segments. For example, the segment parser 630 may divide the blocks over two 80 MHz segments according to equation 1.

$$y_{k,l} = x_{2sN_{ES}\lfloor\frac{k}{sN_{ES}}\rfloor + lsN_{ES} + k\,mod(sN_{ES})}, k = 0, 1, \ldots, \frac{N_{CBPSS}}{2} - 1 \quad (1)$$

As shown in equation 1, $y_{k,l}$ is the output bit number k of frequency segment l. The variable s is the number of coded bits per rail in the constellation mapping and may equal $$\mathrm{ceil}\left(\frac{N_{bpscs}}{2}\right),$$

wherein $N_{bpscs}$ may be the number of coded bits per subcarrier per stream. The variable $N_{ES}$ may be the number of binary convolution encoder. In other words, the segment parser 630 may distribute the input data in chunks of 2 $sN_{ES}$ bits over segments, which may be done in a round-robin fashion. Note that the case that $N_{CBPSS}$ is not divisible by 2 $sN_{ES}$ does not occur for one and two stream rates.

In an example of transmitting a contiguous 160 MHz channel with one synthesizer per segment, in order to deal with a third party receiver that is not capable of separate frequency offsets and timing-drift tracking per segment or channel tracking, a relative frequency error between the RF local oscillators (RFLOs) may be less than 0.005 ppm and the mismatch between the RFLOs and the sampling clock may be less than 0.005 ppm. This may be because the EVM on an outer subcarrier of a 160 MHz transmission of 4 milliseconds (ms) due to the residual timing offset is limited and may be approximately given as in equation 2.

$$20\log_{10}(2\pi \cdot 80e^{6} \cdot 4e^{-3} \cdot 0.005e^{-6}) = -40 \text{ dBc} \quad (2)$$

In case of reception, if a third party transmitter does worse than above, the residual timing offset error due to a mismatch between the RFLO frequency and the sample rate may be corrected by separate frequency offset and timing-drift tracking per segment or channel tracking.

FIG. 6 shows the transmitter 600 including a single 80 MHz RF chain 670 for illustrative simplicity. However, the transmitter 600 may include more than one 80 MHz RF chain 670. For example, for each spatial stream at the 160 MHz bandwidth mode, after the segment parser 630, two 80 MHz segments may be processed by two 80 MHz RF chains 670, one for each segment, to create a single spatial stream of 160 MHz. In this manner, two spatial streams at 160 MHz may be supported with four 80 MHz RF chains 670.

The 80 MHz RF chain 670 may include a BCC interleaver 635, a long training field (LTF) preamble component 640, a QAM 645, an inverse fast Fourier Transform (IFFT) plus guard interval (GI) component 650, a transmitter finite impulse response (TXFIR) plus digital frontend component 655, a short training field preamble component 660, and a digital-to-analog converter (DAC) 665. The 80 MHz RF chain 670 outputs analog I/Q components, which may be provided to one or more antennas.

The TXFIR plus digital frontend component 655 may include a number of subcomponents. For example, the TXFIR plus digital frontend component 655 may include two or more transmitter digital backend components, a beamforming or spatial expansion plus cyclic shift diversity (CSD) component, an IFFT plus GI plus low density parity check (LDPC) tone mapper component, a per transmitter CSD and phase component, a windowing component, an interpolator, a first transmitter FIR component, a first shift component, a digital clipping component, a transmitter gain component, a second FIR component, a second shift component, a digital pre-distortion (DPD) component, a local oscillator and IQ correction component, and a pre-emphasis component.

In one particular example, the interpolator component is a 10/11 interpolator 352 MHz mode component, the first FIR component is a 1×, 2×, 4×FIR component, the first shift component may shift the segments by 0, ±10, ±20, or ±30 MHz and may also duplicate the segments, the second FIR component is a 2×, 4×, 8×FIR component, and the second shift component may shift the segments 0, ±10, ±20, ±30, ±40, or ±45 MHz.

The TXFIR plus digital frontend component 655 may include some changes over typical component configurations in order to handle the 160 MHz bandwidth mode. In one example, these changes are used for the option that includes the ADCs at double the speed (e.g., 320 Msps). For example, the TXFIR may include additional coefficients for the 160 MHz channel. In some examples, the TXFIR of each segment should be sharp enough to keep any spillover to the other segment below an acceptable level, in order to not cause too much co-channel interference (CCI). At least one of the shift components (e.g., digital shifters) may be able to shift the segments by a greater number of MHz (e.g., 40 and 45). This additional digital frequency shift may be needed to support the 165 MHz bandwidth mode. The local oscillator and I/Q correction component may also include more taps for I/Q correction for a more accurate correction over a wider range (e.g., −85 to 85 MHz). A single user beamforming (SUBF) for 160 MHz may function as the beamformer for two TX per segment and up to 2 spatial streams.

In an example where the transmitting device (e.g., an AP 105 or wireless device 110) has four RF chains and four antennas, the two 80 MHz segments may be added in the air. In an example with four RF chains and two antennas, the two 80 MHz segments may be added after the RF chains.

In another example, if a wireless device 110 is permitted to begin a transmit opportunity (TXOP) and the wireless device 110 has at least one media access control (MAC) service data unit (MSDU) pending for transmission for the access category of the permitted TXOP, the wireless device 110 may perform only one of the following steps. In a first option, the wireless device 110 may transmit a 160 MHz or 80+80 MHz mask physical layer convergence protocol (PLCP) protocol data unit (PPDU) if the secondary channel, the secondary 40 MHz channel, and the secondary 80 MHz channel were idle during an interval of point coordination function (PCF) interframe space (PIFS) immediately preceding the start of the TXOP. Alternatively, the wireless device 110 may transmit an 80 MHz mask PPDU on the primary 80 MHz channel if both the secondary channel and the secondary 40 MHz channel were idle during an interval of PIFS immediately preceding the start of the TXOP. In another alternative, the wireless device 110 may transmit a 40 MHz mask PPDU on the primary 40 MHz channel if the secondary channel was idle during an interval of PIFS immediately preceding the start of the TXOP. In yet another alternative, the wireless device 110 may transmit 20 MHz mask PPDU on the primary 20 MHz channel. Finally, the wireless device 110 may restart the channel access attempt by invoking a backoff procedure.

Figure 7:
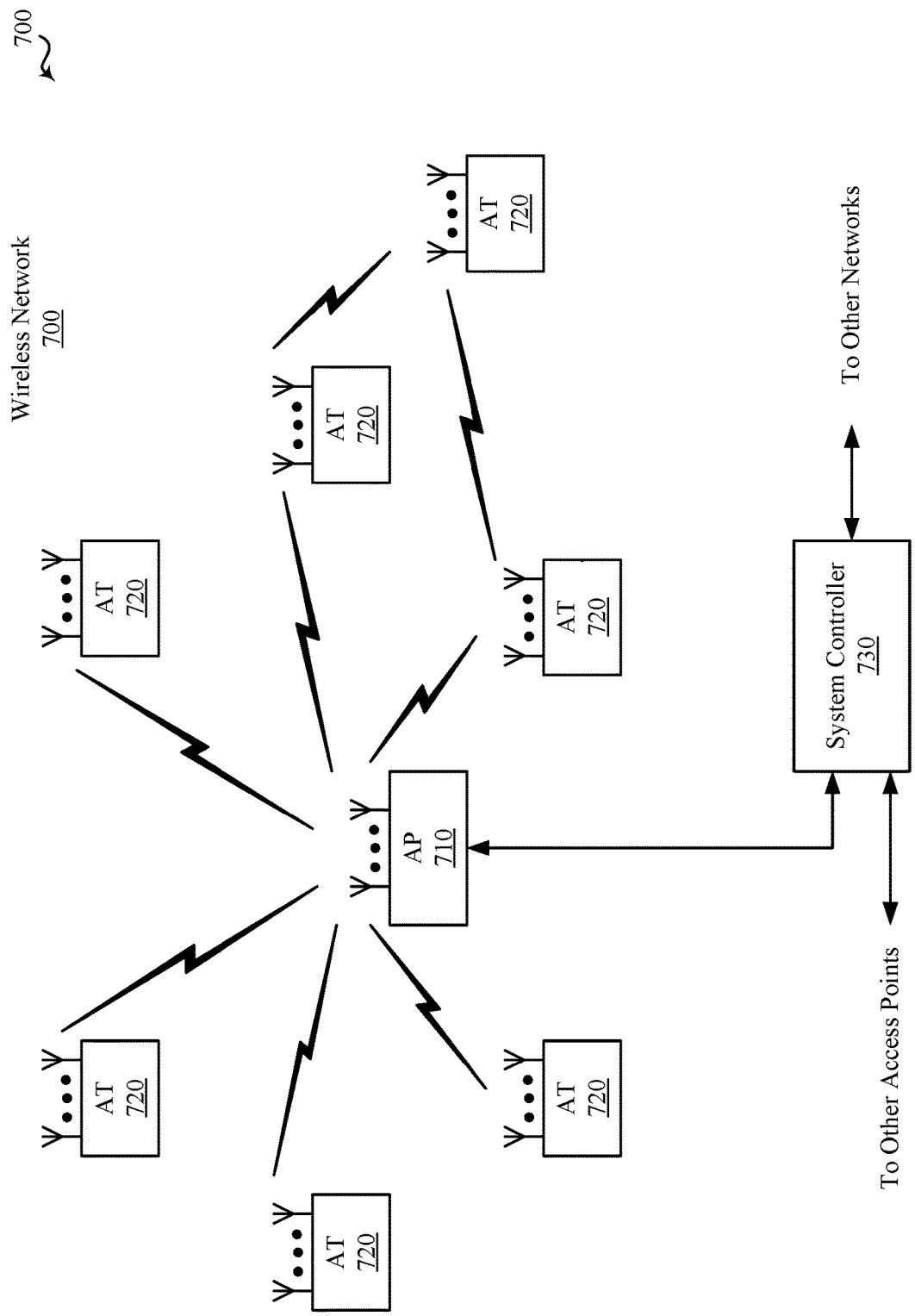
FIG. 7 is a diagram of a wireless communications network, in accordance with various aspects of the present disclosure.

Several aspects of a wireless network will now be presented with reference to FIG. 7. Wireless network 700 is shown with several wireless nodes, generally designated as nodes 710 and 720. Each wireless node is capable of receiving and/or transmitting. In the detailed description that follows, the term "access point" or "AP" is used to designate a transmitting node and the term "access terminal" or "AT" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, user equipment, a mobile station, a subscriber station, a station, a wireless device, a terminal, a node, or some other suitable terminology. The various concepts described throughout this disclosure are intended to apply to all suitable wireless nodes regardless of their specific nomenclature.

Wireless network 700 may support any number of access points distributed throughout a geographic region to provide coverage for access terminals 720. System controller 730 may be used to provide coordination and control of the access points, as well as access to other networks (e.g., Internet) for access terminals 720. For simplicity, one access point 710 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular phone), a laptop computer, a desktop computer, a Personal Digital Assistant (PDA), a digital audio player (e.g., MP3 player), a camera, a game console, or any other suitable wireless node.

Wireless network 700 may support MIMO technology. Using MIMO technology, access point 710 may communicate with multiple access terminals 720 simultaneously using Spatial Division Multiple Access (SDMA). SDMA is a multiple-access scheme that enables multiple streams transmitted to different receivers at the same time to share the same frequency channel and, as a result, provide higher user capacity. This is achieved by spatially precoding each data stream and then transmitting each spatially-precoded stream through a different transmit antenna on the downlink. The spatially-precoded data streams arrive at the access terminals with different spatial signatures, which enables each access terminal 720 to recover the data stream destined for that access terminal 720. On the uplink, each access terminal 720 transmits a spatially-precoded data stream, which enables access point 710 to identify the source of each spatially-precoded data stream.

One or more access terminals 720 may be equipped with multiple antennas to enable certain functionality. With this configuration, multiple antennas at access point 710 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, access point 710 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description, various aspects of the disclosure will be described with reference to a MIMO system supporting any suitable wireless technology, such as Orthogonal Frequency Division Multiplexing (OFDM).

OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

Figure 8:
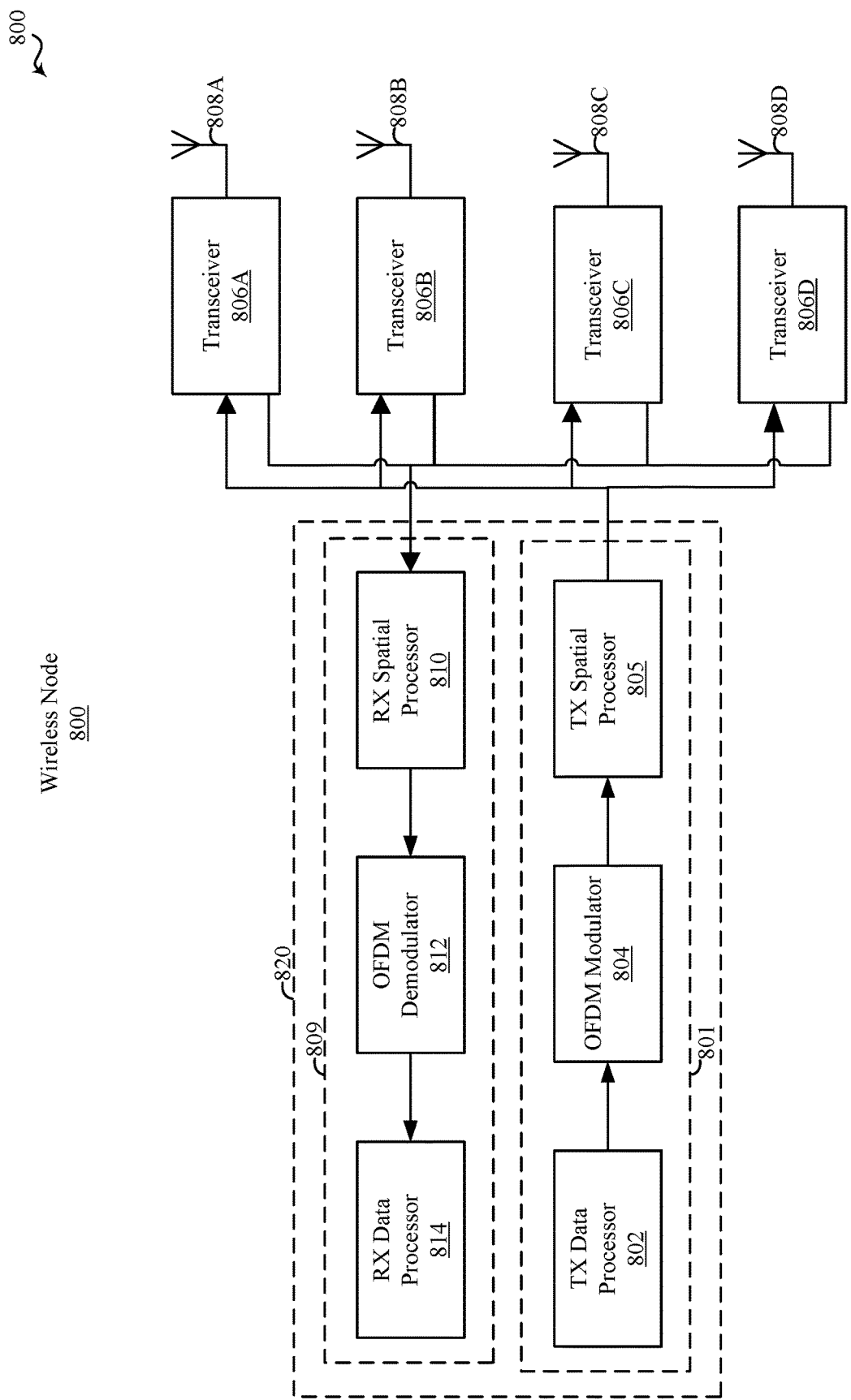
FIG. 8 illustrates a wireless node that includes a front-end processing system in the wireless communications network of FIG. 7, in accordance with various aspects of the present disclosure.

FIG. 8 is a conceptual block diagram illustrating an example of the signal processing functions of the PHY layer. Wireless node 800 includes encoder 801, decoder 809, transceivers 806A-D, and antennas 808A-D. In an aspect, wireless node 800 may include four transceivers that may be connected to one or more antennas 808A-D. In an aspect, encoder 801 and/or decoder 809 may be components of a processor 820.

Processor 820 may provide data packets to one or more transceivers 806A-D that may mix the generated oscillator signal with the data packets to send the packets in a communications channel. In an aspect, processor 820 is also responsible for managing a bus and general processing within wireless node 800, including the execution of software stored on computer-readable media. Processor 820 may be implemented with one or more general-purpose and/or special-purpose processors. Examples include microprocessors, digital signal processors (DSPs), microcontrollers, field-programmable gate arrays (FPGAs), programmable logic devices (PLDs), state machines, gated logic, discrete hardware circuits, and other suitable hardware configured to perform the various functions described throughout this disclosure.

One or more processors in a processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random-access memory (RAM), read-only memory (ROM), programmable ROM (PROM), erasable PROM (EPROM), electrically-erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

In a transmit mode, encoder 801 may use TX data processor 802 to receive data from the MAC layer and encode (e.g., Turbo code) the data to facilitate forward error correction (FEC) at the receiving node. The encoding process results in a sequence of code symbols that that may be blocked together and mapped to a signal constellation by TX data processor 802 to produce a sequence of modulation symbols.

In wireless nodes implementing OFDM, the modulation symbols from the TX data processor 802 may be provided to an OFDM modulator 804. The OFDM modulator splits the modulation symbols into parallel streams. Each stream is then mapped to an OFDM subcarrier and then combined together using an Inverse Fast Fourier Transform (IFFT) to produce a time-domain OFDM stream.

TX spatial processor 805 performs spatial processing on the OFDM stream. This may be accomplished by spatially precoding each OFDM and then providing each spatially-precoded stream to a different antenna 808A-D via a transceivers 806A-D. Each transmitter in transceiver 806A-D modulates an RF carrier with a respective precoded stream for transmission over the wireless channel.

In a receive mode, each transceiver 806A-D receives a signal through its respective antenna 808. Each transceiver 806 may be used to recover the information modulated onto an RF carrier and provide the information to a RX spatial processor 810 within decoder 809.

RX spatial processor 810 performs spatial processing on the information to recover any spatial streams destined for wireless node 800. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for wireless node 800, they may be combined by RX spatial processor 810.

In wireless nodes implementing OFDM, the stream (or combined stream) from RX spatial processor 810 is provided to an OFDM demodulator 812. OFDM demodulator 812 converts the stream (or combined stream) from the time domain to the frequency domain using a Fast Fourier Transform (FFT). The frequency-domain signal comprises a separate stream for each subcarrrier of the OFDM signal. OFDM demodulator 812 recovers the data (i.e., modulation symbols) carried on each subcarrier and multiplexes the data into a stream of modulation symbols.

RX data processor 814 may be used to translate the modulation symbols back to the correct point in the signal constellation. Because of noise and other disturbances in the wireless channel, the modulation symbols may not correspond to an exact location of a point in the original signal constellation. RX data processor 814 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. RX data processor 814 then uses the sequence of code symbol LLRs in order to decode the data that was originally transmitted before providing the data to the MAC layer.

Those skilled in the art will recognize how best to implement the described functionality presented throughout this disclosure depending on the particular application and the overall design constraints imposed on the overall system.

Figure 9:
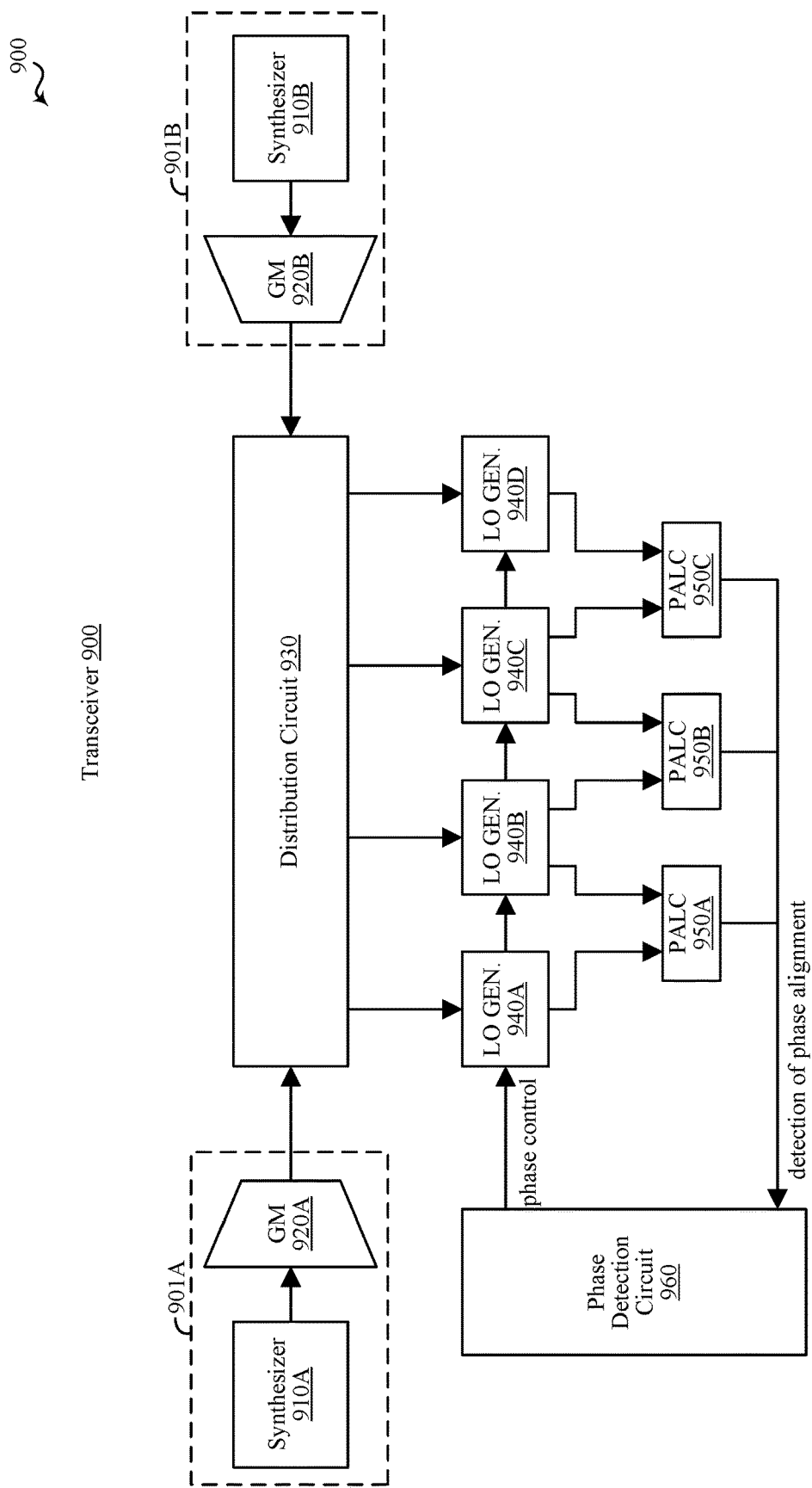
FIG. 9 illustrates a transceiver that includes primary and secondary synthesizers in a wireless node of FIG. 8, in accordance with various aspects of the present disclosure.

FIG. 9 illustrates a transceiver that includes primary and secondary synthesizers in a wireless node of FIG. 8. Transceiver 900 includes primary driver path 901A that includes synthesizer 910A and transconductance (gm) amplifier 920A and a secondary driver path 901B that includes synthesizer 910B and transconductance amplifier 920B. In an aspect, transceiver can also include distribution circuit 930, one or more local oscillator (LO) generators 940A-D, phase-alignment circuits (PALCs) 950A-C, and phase detection circuit 960. In an aspect, multiple components may be combined; for example, in an aspect, PALCs 950A-C and phase detection circuit 960 may be subcomponents of a phase-control circuit. In an aspect, transceiver 900 may use distribution circuit 930 to switch between primary driver path 901A and secondary driver path 901B as inputs to one or more LO generators 904A-D such that the one or more LO generators 940A-D receive either a primary reference signal or a secondary reference signal.

Primary driver path 901A may include primary synthesizer 910A and transconductance amplifier 920A. In an aspect, primary driver path 901A may produce a primary driver frequency signal (e.g., a first reference signal or primary synthesizer signal) that is transmitted via distribution circuit to one or more LO generators 940A-D as an input signal. In an aspect, the LO generators 940A-D that receive the first reference signal as an input may produce a local oscillator (LO) signal as an output signal based on the first reference signal.

Synthesizer 910A may include a configurable oscillator, such as a voltage-controlled oscillator (VCO) and a control circuit, such as a phase-locked loop (PLL) circuit to control the input into the configurable oscillator. In an aspect, synthesizer 910A may produce a range of output frequencies. For example, in an aspect, the VCO in synthesizer 910A may produce a first reference signal that has an output frequency in the range of 3.2-4 GHz. In an aspect, synthesizer 910A may produce signals that have output frequencies in other ranges (e.g., 2.0-3.0 GHz). In an aspect, synthesizer 910A may receive a signal from an external PLL (e.g., a baseband phase-locked loop) as an input.

Transconductance (gm) amplifier 920A may convert the output voltage frequency signal produced by synthesizer 910A to a current signal (e.g., first reference signal). As will be discussed in further detail below, gm amplifier 920A may include one or more power-down switches that may enable faster switching of LO generators 940A-D such that switching can occur on a per-packet basis (e.g., switching every 100 ns). In an aspect, gm amplifier 920A may receive an input signal from a buffer that is placed between the output of the configurable oscillator in synthesizer 910A and the input of gm amplifier 920A.

Secondary driver path 901B is similar to primary driver path 901A and may include secondary synthesizer 910B and transconductance amplifier 920B to produce a secondary driver frequency signal (e.g., secondary reference signal) to be delivered to at least one LO generator 940A-D via distribution circuit 930.

Synthesizer 910B be similar to synthesizer 910A and may include a configurable oscillator, such as a VCO, and a control circuit, such as a PLL circuit, to control the input into the configurable oscillator. In an aspect, synthesizer 910B may produce a range of output frequencies. For example, in an aspect, the VCO in synthesizer 910B may produce a first reference signal that has an output frequency in the range of 3.2-4 GHz. In an aspect, synthesizer 910B may receive a signal from an external PLL (e.g., a baseband phase-locked loop) as an input. In an aspect, secondary driver path 901B may have synthesizer 910B generate a signal with an output frequency that is different from the output frequency used by the first reference signal produced by primary driver path 901A. For example, synthesizer 910A may produce a first reference signal with a 2.4 GHz frequency, while synthesizer 910B may produce a second reference signal with a 5 GHz frequency. In an aspect, secondary driver path 901B may connect to one or more LO generators 940A-D in specified operational modes of transceiver 900 such that the one or more LO generators 940A-D may generate a second reference signal.

In an aspect, distribution circuit 930 may connect a subset of LO generators 940A-D (e.g., LO generators 940C-D or only LO generator 940D) such that only the LO generators in the subset are configured to switch between receiving the first and second reference signals such that the subset of LO generators switches between producing the first or second reference signals. In an aspect, the subset of LO generators may switch between receiving the first and second reference signals on a per-packet basis. In an aspect, transceiver 900 may use one or more of PALCs 950A-C and/or phase detection circuit 960 to ensure that the LO signals generated by LO generators 940A-D are aligned in phase with each other and/or with the first and/or second reference signals.

In an aspect, transceiver 900 may switch between operating modes based on the number of LO generators 940A-D that are connected to secondary driver path 901B. For example, when operating in "4+0" mode, all of LO generators 940A-D receive the first reference signal from primary driver path 901A. Conversely, when operating in "3+1" mode, one of the LO generators (e.g., LO generator 940D) may switch inputs such that it receives the second reference signal from secondary driver path 901B. Similarly, when operating in "2+2" mode, a subset of two of the LO generators (e.g., LO generators 940C-D) may switch to receive the second reference signal as an input to produce the LO signals based on the second reference signal. In an aspect, transceiver 900 may be configured to switch between operating modes as it receives each packet (e.g., switch between operational modes on a per-packet basis).

Distribution circuit 930 may include one or more hardware and/or software components (e.g., cascode circuits and/or transconductance amplifiers) that that are configured to receive either at least one of the first or second reference signals as an input and drive a LO generator 940A-D based on the respective input signal. For example, distribution circuit 930 may receive a first reference signal from primary driver path 901A and may generate an LO control signal (e.g., distributed local oscillator or "distLO" signal) based on the first reference signal. In an aspect, distribution circuit 930 may have its hardware components connected in a specific configuration, such as a cascade of cascode circuits and gm amplifiers connected in series. In an aspect, other configurations of distribution circuit 930 are possible, such that the LO generators 940A-D are connected in differing configurations. In an aspect, distribution circuit 930 may be configured to choose an input for a particular LO generator. For example, each cascode circuit that provides an LO control signal may include a multiplexer that receives the first and second reference signals as inputs and, based on a received control signal related the operational mode of the transceiver, chooses the applicable reference signal to control the connected LO generator 940A-D via the LO control signal.

Local oscillator generator circuits 940A-D ("LO generators") may be one or more circuits included in transceiver 900 that may each generate a local oscillator signal that may be used by transceiver 900 for modulating and/or demodulating data packets transferred in a communications channel. For example, in an aspect, LO generators 940A-D may include one or more dividers and/or mixers to modify an input signal (e.g., LO control signal) such that the output signal is a fractional multiple of the input signal.

In an aspect, each of LO generators 940A-D may be included in a separate transceiver 900 (e.g., LO generator 940A is included in transceiver 806A, LO generator 940B is included in transceiver 806B, etc.). In such instances, portions of distribution circuit 930 may be included in separate transceivers 806A-D, while driver paths 901A-B, PALCs 950A-C, and phase detection circuit 960 may be included as separate hardware components outside of transceiver 900 in wireless node 800.

In an aspect, each of LO generators 940A-D may receive the first reference signal as an input from primary driver path 901A. In an aspect, one or more of the LO generators, such as LO generators 940C-D, may switch between receiving the first and second reference signals as inputs; in an aspect, the reception of the first or second reference signal as an input may be based on the operating mode of transceiver 900. In an aspect, each of LO generators 940A-D may generate one or more signals based on the respective input reference signal. For example, in an aspect, each LO generator may be configured to produce LO signals as I and Q signals (with the Q signal being phase-shifted by 90 degrees) based on the input reference signal. In an aspect, the phase of the LO signals produced by each of the LO generators may be based on a phase control signal received from phase detection circuit 960.

In an aspect, each of phase-alignment circuits (PALCs) 950A-C may receive LO signals generated from two LO generators 940A-D and may output a signal based on the detection of a phase difference between the two LO signals. For example, PALC 950B may receive a signal from LO generators 940B-C. In an aspect, PALC 950A-C may be a mixer or multiplier circuit that produces the detection signal that is sent to phase detection circuit 960.

In instances where the LO signals generated by the two LO generators are not aligned, PALC 950B may detect the phase shift and may send a detection signal relating to the detected phase shift to phase detection circuit 960. In an aspect, phase detection circuit 960 may send one or more phase control signals to LO generators 940B-C such that the LO generators 940B-C generate signals that are aligned in phase.

Phase detection circuit 960 may receive measurement signals in the form of detection signals from PALCs 950A-C that relate to the detection of phase differences between two LO signals generated by LO generators 940A-D. In an aspect, phase detection circuit 960 may generate a phase control signal that is sent to at least one LO generator (e.g., LO generator 940A). In an aspect, the phase control signal is sent to each LO generator 940A-D separately; in an aspect, the phase control signal is passed through each LO generator 940A-D. Phase detection circuit 960 may control the phase alignment of the LO signals generated by all of LO generators 940A-D. In an aspect, the phase alignment of LO generators 940A-D may occur after switching operational modes of transceiver 900. In an aspect, for example, phase detection circuit 960 may align the LO signals generated after reception of one or more data packets (e.g., every 400 ns). In an aspect, for example, phase detection circuit 960 may generate and a specific control signal (e.g. an "MDIV" signal) that sets the value of configurable dividers used in one or more of LO generators 940A-D to produce the respective LO signals based on the respective input reference signals.

In an aspect, phase detection circuit 960 may include a phase-alignment state machine that is based on the operational mode of transceiver 900 and the switching of transceiver 900 is switching between operational modes. In an aspect, phase detection circuit 960 may also provide operational mode control signals (e.g., "MODE" signals) to distribution circuit 930 and/or PALCs 950A-C to ensure that the LO generators 940A-D are aligned in phase. In an aspect, phase detection circuit 960 may phase-align the LO signals produced by LO generators 940A-D with the first and/or second reference signals produced by driver paths 901A-B.

Figure 10:
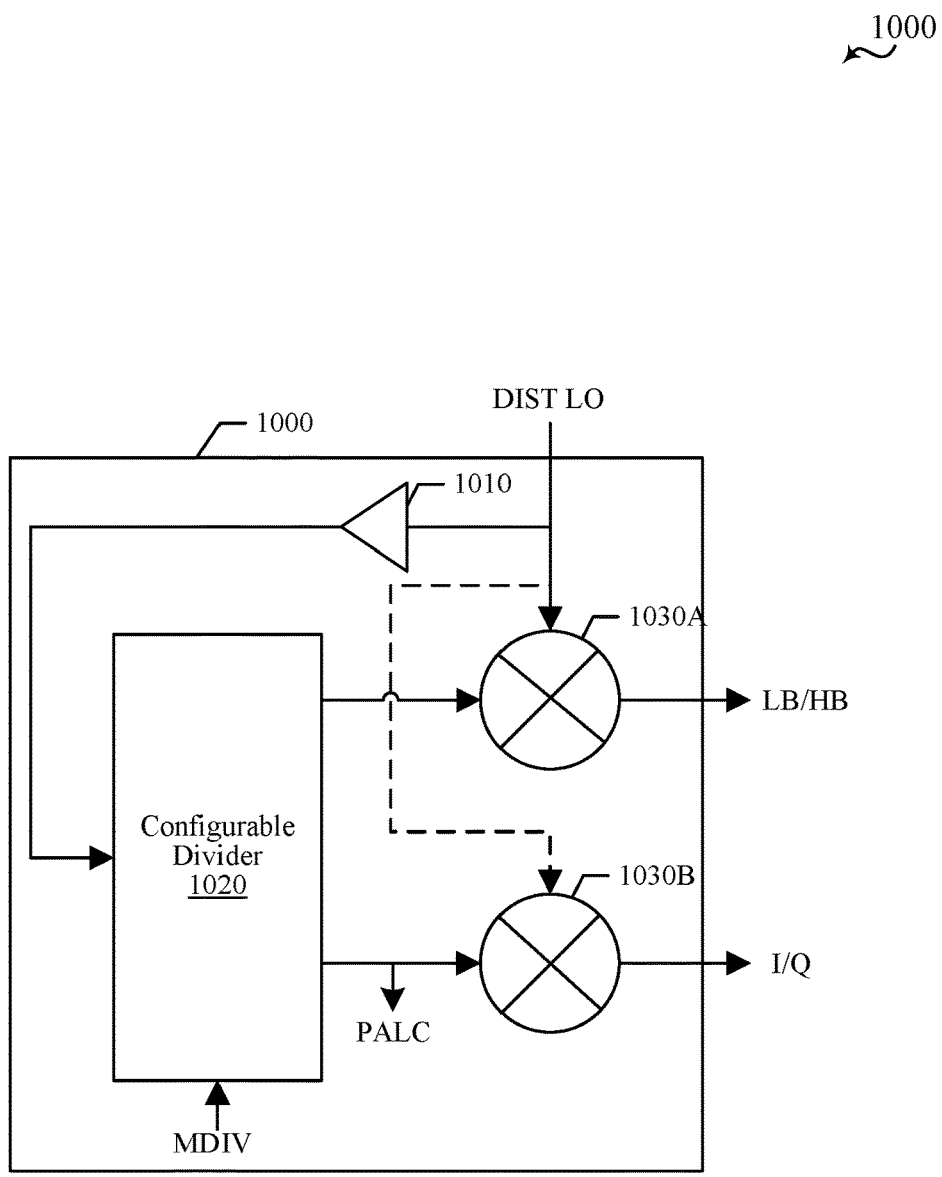
FIG. 10 illustrates a frequency generator in a transceiver of FIG. 9, in accordance with various aspects of the present disclosure.

FIG. 10 is a frequency generator in a transceiver of FIG. 9. Frequency generator 1000 may be similar to LO generators 940A-D of transceiver 900 and may generate a one or more modulation signals based on an input signal received from a driver path 901A-B via distribution circuit 930. In an aspect, frequency generator 1000 includes a buffer 1010, a configurable divider 1020, and mixers 1030A-B.

In an aspect, frequency generator 1000 may receive an input signal that is used to produce one or more modulation signals as outputs. In an aspect, for example, when frequency generator 1000 is an LO generator 940A-D, it may receive an LO control signal (e.g., a "dist LO" signal) as an input signal that is based on a reference signal. In an aspect, the LO control signal may switch between the first and second reference signals; in such instances, the modulation signals produced by frequency generator 1000 may switch based on the input signal received.

Configurable divider 1020 may be a circuit that includes one or more divider circuits that modify the input signal based on the enabled divider. For example, in an aspect, configurable divider may include a divide-by-2 and a divide-by-3 divider; based on the received control signal (e.g., "MDIV" signal) from phase detection circuit 960, frequency generator 1000 may use the chosen divider to modify the received input signal. In an aspect, configurable divider 1020 may include a series of dividers that are split between a high-band (HB) path and a low-band (LB) path that may be chosen by the received control signal.

Mixers 1030A-B may receive the divided signal from configurable divider and/or the LO control signal to provide one or more modulated signals that may be used to modulate and/or demodulate signals used in a communications channel. In an aspect, each of mixers 1030A-B receive each of the divided signal from configurable divider 1020 and the LO control signal from distribution circuit 930. In an aspect, each mixer 1030A-B may produce component I and Q signals that based on the input signals. In an aspect, the output signals may be modified by another series of dividers such that the modulated signals have a specified target frequency. For example, in an aspect, frequency generator may receive an input reference signals and may use dividers included in configurable divider 1020 and/or dividers after mixers 1030A-B to produce the target frequency for the modulation signal.

Figure 11:
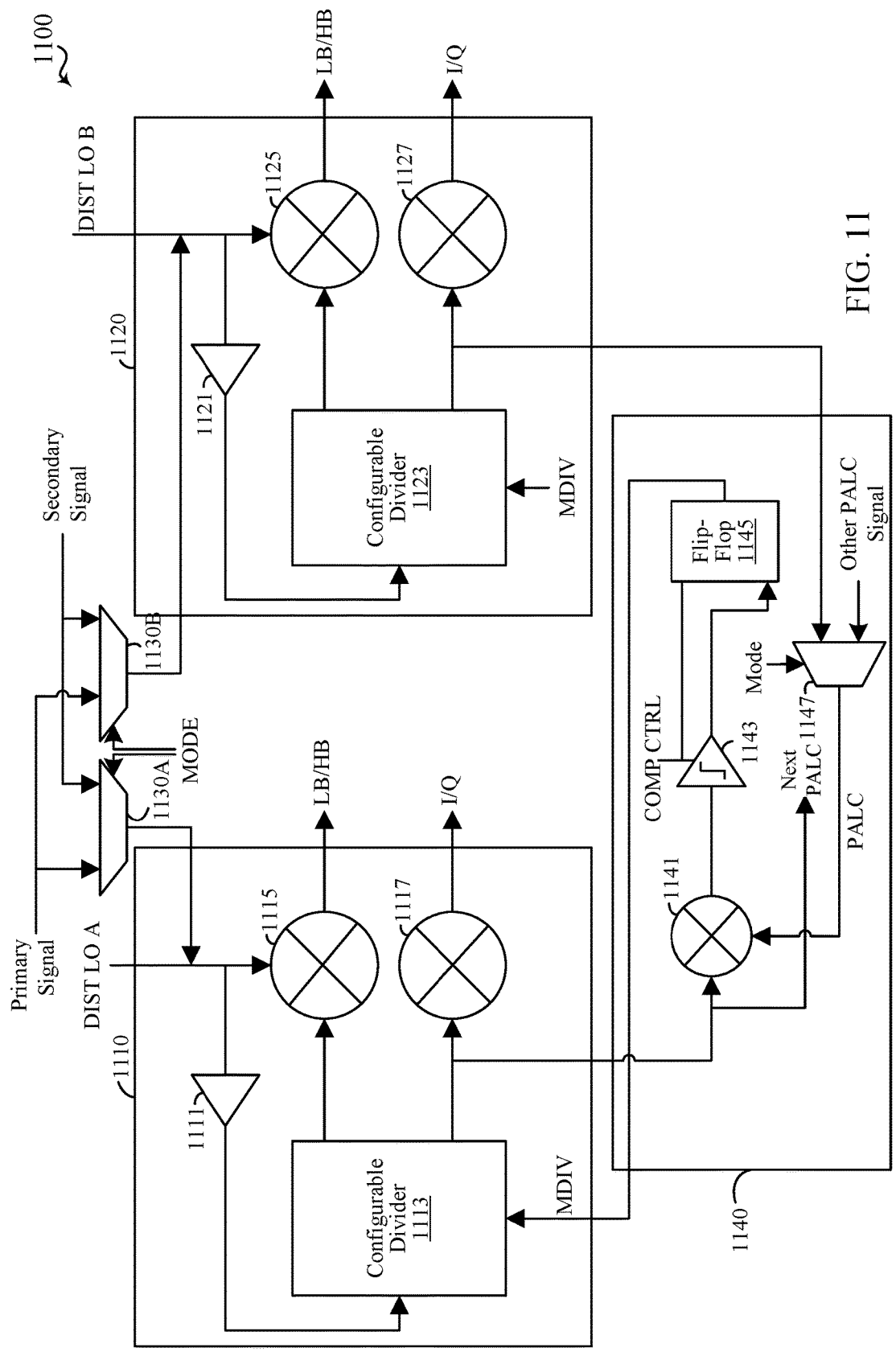
FIG. 11 illustrates frequency generators and a phase-alignment circuit in a transceiver of FIG. 9, in accordance with various aspects of the present disclosure.

FIG. 11 illustrates frequency generators and a phase alignment circuit in a transceiver of FIG. 9. Circuit 1100 includes components similar to components in transceiver 900 and/or frequency generator 1000 that are used to generate LO signals that are phase-aligned using a phase-alignment circuit. Circuit 1100 includes frequency generators 1110, 1120, multiplexers 1130A-B, and phase-alignment circuit (PALC) 1140. In an aspect, a phase detection circuit 960 may use an operational mode control signal (e.g., "MODE" signal) to control multiplexers 1130A-B and multiplexer 1147 in PALC 1140 to control the respective input signals received by various components in circuit 1100. In an aspect, on or more of frequency generators 1110, 1120 may switch between receiving the first or second reference signal as an input based on the operational mode control signal received by the multiplexers.

In an aspect, multiplexers 1130A-B may receive an operational mode control signal that is related to the operational mode of the transceiver. For example, in an aspect, phase detection circuit 960 may send an operational mode control signal that specifies whether transceiver 900 is in, for example, "4+0", "3+1", or "2+2" mode. In such instances, frequency generators 1110, 1120 may be similar to LO generators 940C-D and may switch inputs between a primary signal (e.g., based on the first reference signal) and a secondary signal (e.g., based on the second reference signal) depending on the operational mode of the transceiver. For example, when transceiver 900 is in 4+0 mode, both frequency generators 1110, 1120 may receive the primary signal, while both frequency generators 1110, 1120 may receive the secondary signal when transceiver 900 is in 2+2 mode. Multiplexers 1130A-B may, based on the operational mode control signal, send either the primary or secondary signal into the LO control signal ("Dist LO" signal) that is sent to the buffers 1111, and/or mixers 1115, 1117, 1125, 1127.

In an aspect, each of frequency generators 1110, 1120 may be similar to frequency generator 1000 and LO generators 940A-D and may generate separate LO signals based on the input signals receive via multiplexers 1130A-B. In an aspect, the configurable divider 1113, 1123 in each frequency generator 1110, 1120 may receive a control signal from a connected phase-alignment circuit (e.g., PALC 1140) that enables one or more dividers included in the configurable divider. For example, PALC 1140 may provide a divider control signal (e.g., "MDIV" signal) to configurable divider 1113 to enable either a divide-by-2 or a divide-by-3 circuit based on results of comparing two LO signals generated by frequency generators 1110, 1120. In an aspect, the choice of divider may be based on a difference in phase between the two LO signals. In an aspect, configurable dividers 1113, 1123 may receive the control signal from another component, such as phase detection circuit 960.

In an aspect, phase-alignment circuit 1140 may be connected to each of frequency generators 1110, 1120 and may compare the received signals from the frequency generators 1110, 1120 and may generate detection signals and/or control signals based on the results of the comparison. For example, in an aspect, PALC 1140 may receive output signals from the respective configurable dividers 1113, 1123 from frequency generators 1110, 1120. In an aspect, PALC 1140 may use mixer 1141 and comparator 1143 to compare the two received signals and may send a control signal to configurable divider 1113 based at least on the output of the comparator. In an aspect, the signal produced from flip-flop 1145 is based on the value of the comparator 1143 and a control signal that is sent to the comparator 1143 and the flip-flop 1145. In an aspect, the control signal produced by flip-flop 1145 may control the value of the divider or dividers enabled in configurable divider 1113.

In an aspect, PALC 1140 may receive other LO signals from other frequency dividers and may choose to compare those signals via multiplexer 1147. In an aspect, PALC 1140 may use another signal received from another PALC based on an operational mode control signal received from multiplexer 1147. In an aspect, PALC 1140 may send one of the signals it receives to another PALC before mixer 1141 mixes the signals. In an aspect, PALC 1140 may provide control signals such that the outputs of configurable divider 1113, 1123 are aligned in phase. In another aspect, frequency generators 1110, 1120 may receive phase control signals from phase detection circuit 960 and/or PALCs 950A-C.

Figure 12:
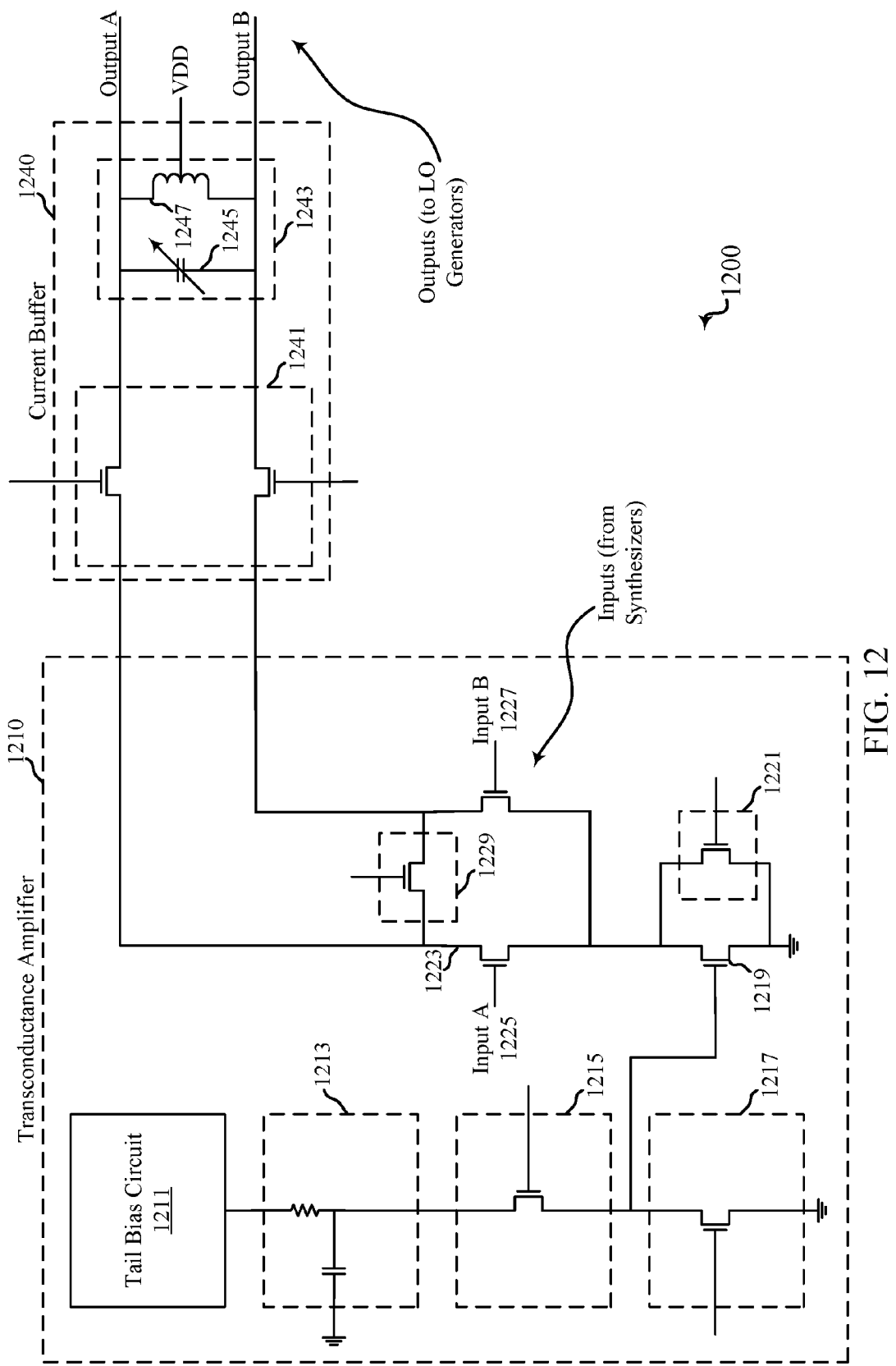
FIG. 12 illustrates a portion of a driver path in a transceiver of FIG. 9, in accordance with various aspects of the present disclosure.

FIG. 12 is a portion of a driver path in a transceiver of FIG. 9. Driver path portion 1200 includes a transconductance amplifier 1210 and a current buffer 1240. Driver path portion 1200 may be a component of primary or secondary driver paths 901A-B in transceiver 900. In an aspect, transceiver 900 may use driver path portion 1200 to provide a reference signal to one or more LO generators 940A-D via distribution circuit 930.

Transconductance (gm) amplifier 1210 includes a tail bias circuit 1211, a filter 1213, tail bias power-down (e.g., disable) switches 1215, 1217, a switch 1219, an optional tail bias shorting switch 1221, differential amplifier 1223, and output shorting switch 1229. In an aspect, gm amplifier 1210 may receive an oscillator voltage signal as differential inputs 1225, 1227 into differential amplifier 1223 and may produce a differential current signal that current buffer 1240, which may produce a reference signal that is sent to LO generators 940A-D.

In an aspect, gm amplifier 1210 includes multiple tail bias power-down (e.g., disable) switches 1215, 1217, that are connected to various components within gm amplifier 1210 to short switches when the circuit is disabled. This may prevent surges from filter 1213 when the amplifier switches between enabling and disabling states. In an aspect, use of tail bias power-down switches 1215, 1217, optional tail bias shorting switch 1221, and output shorting switch 1229 may reduce coupling between connected LO generators 940A-D. In an aspect, tail bias shorting switches 1215, 1217 may help prevent a long settling time for the gm amplifier 1210 due to bias filtering (e.g., filter 1213) when the circuit is enabled. In an aspect, transconductance amplifier 1210 may enable faster switching of the connected LO generator 940A-D such that the LO generator 940A-D may switch inputs on a per-packet basis.

Current buffer 1240 includes one or more multiplexer circuits 1241 and a tuning circuit 1243. The tuning circuit 1243 includes a tunable capacitor 1245 and an inductor 1247. In an aspect, the inductor 1247 may include a mid-tap that is connected to a power supply voltage (e.g., $V_{DD}$). In an aspect, current buffer 1240 may modify the differential current provided by differential amplifier 1223 of gm amplifier 1210 to provide a reference signal as a scaled differential current. In an aspect, the output provided by current buffer 1240 may be provided to distribution circuit 930, which may provide the output to one or more LO generators 940A-D.

In an aspect, current buffer 1240 may use multiplexer 1241 to receive the signal produced by input gm amplifiers 1210. In an aspect, current buffer 1240 may include an additional multiplexer 1241 connected in parallel before the input of tuning circuit 1243, with the current buffer 1240 using the plurality of multiplexers 1241 to choose a specific gm amplifier 1210 as an input. Current buffer 1240 may act in a similar manner to distribution circuit 930 selecting an input between primary and secondary driver paths 901A-B.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

The description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 13:
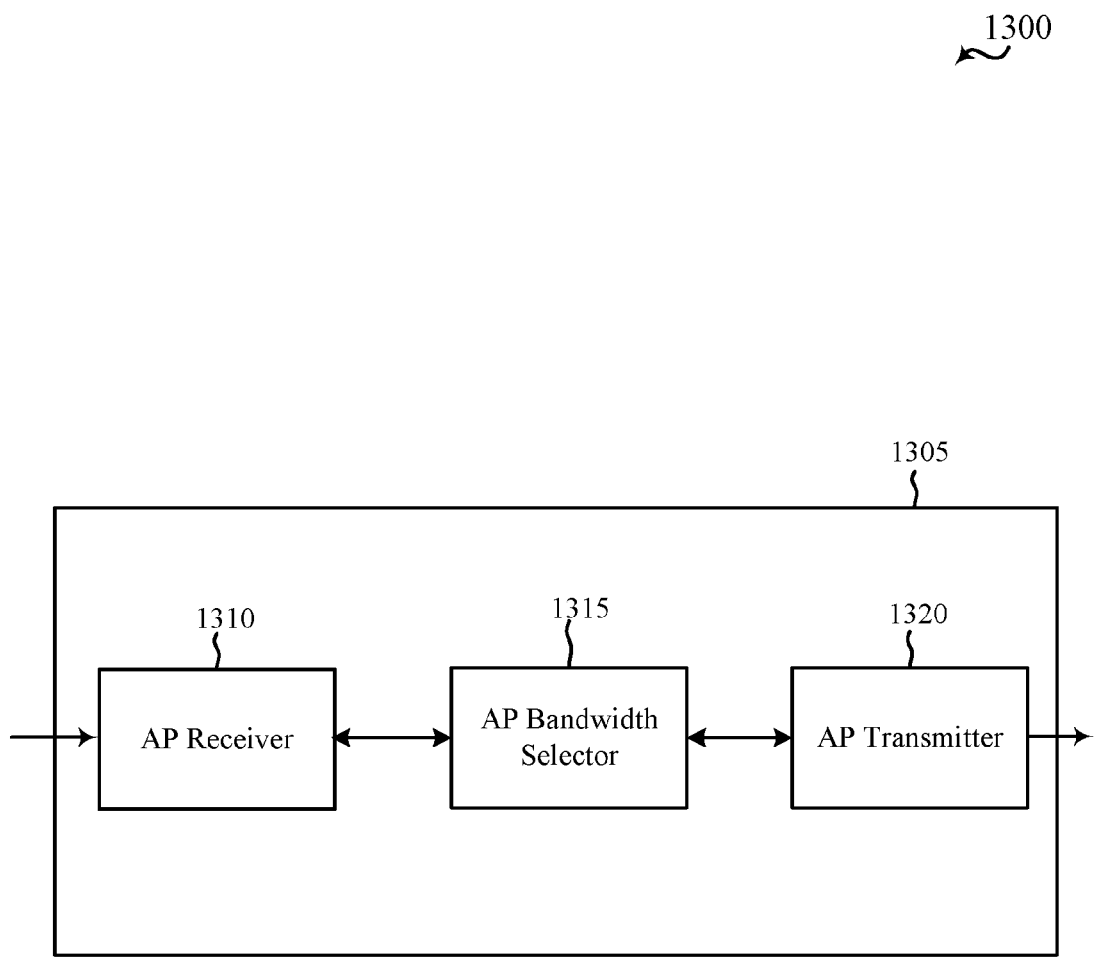
FIG. 13 shows a block diagram of a device configured for use in wireless communication, in accordance with various aspects of the present disclosure.

FIG. 13 shows a block diagram 1300 of a wireless device 1305 for use in an AP for wireless communication, in accordance with various aspects of the present disclosure. The wireless device 1305 may be an example of one or more aspects of a APs 105 described with reference to FIGS. 1 and 3-5. The wireless device 1305 may include a receiver 1310, an AP bandwidth selector 1315, and/or a transmitter 1320. The wireless device 1305 may also be or include a processor. Each of these components may be in communication with each other.

The wireless device 1305, through the receiver 1310, the AP bandwidth selector 1315, or the transmitter 1320, may be configured to perform functions described herein. For example, the wireless device 1305 may be configured to operate in one or more bandwidth modes, including a 20, 40, 80, 80+80, 160 contiguous, and 165 MHz bandwidth modes.

The components of the wireless device 1305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 1310 may receive information such as packets, user data, and/or control information associated with various information channels (e.g., control channels, data channels, etc.). The receiver 1310 may be configured to receive one or more data packets at 160 MHz or 165 MHz, for example. Information may be passed on to the AP bandwidth selector 1315, and to other components of the wireless device 1305.

In some examples, the AP receiver 1310 may include some features in order to support the 160 MHz bandwidth mode. In some examples, the sampling rate of an ADC of the AP receiver 1310 may be increased (e.g., doubled) to 320 Msps and it has a bitwidth of 10 bits. An extrapolated initial frequency offset estimate on a primary 20 MHz channel may be applied to a secondary 80 MHz channel starting from a first VHT-LTF symbol. The AP receiver 1310 may also be capable of independent phase, frequency, and timing-drift tracking per segment. A channel estimation may perform two different two spatial stream channel estimates. The AP receiver 1310 may also include two 2×2 QR decomposition (QRD) components and a MIMO decoder. In some examples, the AP receiver 1310 includes two MIMO decoders, one per segment. The AP receiver 1310 may also perform segment deparsing (e.g., the inverse of segment parsing at the transmitter) before stream deparsing. The AP receiver 160 may also support radar detection for 160 MHz.

The AP receiver 1310 may also include an automatic front end (AFE) component in order to perform automatic gain control (AGC). The automatic gain control may be performed per chain or per segment. Further, a receiver finite impulse response (FIR) filter (RXFIR) for one segment may be sharp enough to suppress the adjacent channel interference (ACI) of another segment, where the Fast Fourier Transform (FFT) is oversampled by a factor of two.

Detection for the AGC may be done with all four receive antennas on the primary segment. Some delay may be introduced by adding an additional RXFIR. Power estimates for the ADC may be performed at 320 MHz.

After the AP receiver 1310 detects an 160 MHz packet, the wireless device 1305 switches to the 2×2 mode during very high throughput short training field (VHT-STF) by changing frequency shift on input of 2 chains from −40 to +40 MHz if the primary 20 MHz channel is in a lower segment or from +40 to −40 MHz if the primary 20 MHz channel is in an upper segment. For example, these are the cases where a carrier frequency is −40 MHz from the center of the upper segment or +40 MHz from the center of the lower segment, respectively. Alternatively, the frequency shifts may be static, but the proper first FIR output is selected. For example, for the 160 MHz bandwidth mode, two digital backend chains may select a first FIR FFT/TDC ext80 MHz output, while the other backend chains stay with the primary 80 MHz output. The frequency shifts may also be +45 MHz, −45 MHz, +42.5 MHz, or −42.5 MHz The wireless device 1305 may also support different listen and detection modes. That is, the wireless device 1305 may monitor or listen for traffic using bandwidth modes. Dynamic switching may be used to during VHF-STF to switch between a given listen mode and a detection mode.

In some examples capable of supporting the 165 MHz bandwidth mode, the AP receiver 1310 may use an 80+80 MHz spectral mask. for example, if the transmitter local oscillator is at 5732.5 MHz, each 80 MHz spectrum may have a level of about 20.3 dBr, which combined may allow a level of about −17.3 dBr for the transmit local oscillator (TXLO). In some examples, the TXLO may be at anywhere between 5730 through 5735 MHz, which may require a level of −10 dBr. In other examples, other frequencies for the TXLO may be used.

For channel estimation and compressed beamforming feedback, the AP receiver 1310 may include a channel estimation block that supports two spatial stream 80 MHz channel estimates (i.e., one per segment). For VHT160, a VHT compressed beamforming feedback matrix subfield of a VHT compressed beamforming feedback report field may consist of the (grouped) tones of the lower and upper segment (which may be ordered from most left tone in frequency domain to most right tone). In one example, the AP receiver includes two 2×2 80 MHz singular value decomposition (SVD) components. For MU feedback, a delta SNR in a VHT MU exclusive beamforming report field is computed with respect to the average SNR (or average channel power) over all tones (i.e., not per segment).

In some examples, the AP receiver 1310 may not support implicit beamforming in an 80+80 MHz bandwidth mode, but may support implicit beamforming for STAs that operate according to bandwidth modes of 80 MHz or less. If in the 80+80 MHz bandwidth mode the default listen mode uses three receive chains on a primary 80 MHz channel and three receive chains on a secondary 80 MHz channel, implicit beamforming channel estimates on L-LTFs from the STA may not be received over the optimal four receive chains.

To address this issue, the MAC layer of the AP receiver 1310 may determine when an acknowledgement (ACK) message with a bandwidth of 80 MHz or less is expected from the STA. When such an ACK message is expected, the MAC layer of the AP receiver 1310 may signal to the PHY layer to adjust the number of receive chains used for the primary 80 MHz channel (e.g., from three receive chains to four receive chains) to allow for implicit beamforming channel estimates to be performed on the desired number of receive chains. This signaling may be via a management message from the MAC layer to the PHY layer. The management message may indicate the number of receive chains to allocate to the listening mode of the primary 80 MHz channel (e.g., four receive chains). Alternatively, the management message may indicate a number of frequency segments for the listen mode, with an explicit or implicit message that a certain number of receive chains (e.g., four) is to be tuned to the first frequency segment and the remainder of the receive chains (e.g., two) is to be tuned to the second frequency segment.

The AP receiver 1310 may also perform frequency offset estimation and pilot tracking. A 160 MHz device, for example, may use a separate phase-locked-loop (PLL) per segment, which may cause phase noise variations between the segments that must be tracked separately. If a third part transmitter sends 160 MHz as 80+80 MHz with two RFLOs, there may be a risk of inaccuracy between the segment dividers in generating the two RFLOs. In such a case, the AP receiver 1310 may perform separate frequency and timing tracking per segment in addition to separate phase tracking per segment.

In some examples, the inaccuracy between the segment dividers may not be bad to warrant a separate initial frequency offset estimate on the secondary 80 MHz channel, so the AP receiver 1310 may extrapolate the initial frequency offset estimate on the primary 20 MHz channel to apply it on the secondary 80 MHz channel starting from a first VHT Long Training Field (VHT-LTF) symbol. An example frequency offset is provided in equation 3, where $f_{center,s80}$ and $f_{center,p20}$ are the center RF frequency of the secondary 80 MHz channel and the primary 20 MHz channel, respectively.

$$f_{off,s80} = f_{off,p20} \frac{f_{center,s80}}{f_{center,p20}} \quad (3)$$

In some examples, pilot tracking per segment may be the same as a typical 80 MHz pilot tracking with the understanding that the carrier frequency per segment is in the middle of the corresponding segment. In some examples, separate timing drift per segment is possible.

The AP receiver 1310 may also include two 2×2 QRD components and MIMO decoders, one per segment. In some examples, the AP receiver 1310 may alternatively map the two spatial stream 160 MHz channel onto a four spatial stream 80 MHz MIMO decoder. That is, the two spatial streams may be combined onto the two 80 MHz segments to four spatial streams using a block diagonal channel matrix with the two 2×2 segment channel matrices on the diagonal.

The following describes a way to use a 4×4 MIMO decoder for two 2×2 MIMO decodings. If $y_{i,p80}(k)$ represents the $i^{th}$ RX signal on the $k^{th}$ subcarrier of the primary 80 MHz segment and $y_{i,s80}(k)$ that of the secondary 80 MHz segment, $x_{i,p80}(k)$ and $x_{i,s80}(k)$ the respective TX signals, and $H_{p80}(k)$ and $H_{s80}(k)$ the 2×2 MIMO channels, then this may be combined (omitting subcarrier index k) in a 4×4 equation as shown in equation 4.

$$\begin{pmatrix} y_{1,p80} \\ y_{2,p80} \\ y_{1,s80} \\ y_{2,s80} \end{pmatrix} = \begin{pmatrix} h_{11,p80} & h_{12,p80} & 0 & 0 \\ h_{21,p80} & h_{22,p80} & 0 & 0 \\ 0 & 0 & h_{11,s80} & h_{12,s80} \\ 0 & 0 & h_{21,s80} & h_{22,s80} \end{pmatrix} \begin{pmatrix} x_{1,p80} \\ x_{2,p80} \\ x_{1,s80} \\ x_{2,s80} \end{pmatrix} \quad (4)$$

Doing the QR decomposition on above block diagonal 4×4 channel matrix results in equation 5.

$$QR = qr\left(\begin{pmatrix} h_{11,p80} & h_{12,p80} & 0 & 0 \\ h_{21,p80} & h_{22,p80} & 0 & 0 \\ 0 & 0 & h_{11,s80} & h_{12,s80} \\ 0 & 0 & h_{21,s80} & h_{22,s80} \end{pmatrix}\right) = \begin{pmatrix} q_{11,p80} & q_{12,p80} & 0 & 0 \\ q_{21,p80} & q_{22,p80} & 0 & 0 \\ 0 & 0 & q_{11,s80} & q_{12,s80} \\ 0 & 0 & q_{21,s80} & q_{22,s80} \end{pmatrix} \begin{pmatrix} r_{11,p80} & r_{12,p80} & 0 & 0 \\ 0 & r_{22,p80} & 0 & 0 \\ 0 & 0 & r_{11,s80} & r_{12,s80} \\ 0 & 0 & 0 & r_{22,s80} \end{pmatrix} \quad (5)$$

From equation 5, the QR decomposition may not change the property that the two 2×2 MIMO equations are independent. This may allow for independent frequency and phase tracking per 80 MHz segment. In some situations, parts of the 4×4 MIMO processing that are not being used may be disabled to save power.

The AP receiver 1310 may perform radar detection over the selected bandwidth. In one example, the AP receiver 1310 may perform radar detection separately on the primary and secondary segments. Alternatively, the AP receiver 1310 may increase radar FFTs by 2 as well as the clock speed of the other processing elements. For example, a short FFT may be doubled from 128 to 256 points and a regular FFT may be doubled from 512 to 1024 points. These FFTs may be reused for round trip time (RTT) and spectral scanning. In some examples, only one segment needs to do radar detection for the lowest 160 MHz channel and the 160 MHz bandwidth mode. In some examples, the radar detection hardware may be run at the ADC rate while the software performs any filtering.

If fine timing measurements (FTMs) are sent in VHT160 format, the AP receiver 1310 may perform 80+80 MHz RTT processing using the channel estimates on the VHT-LTFs. For legacy octuplicate (i.e., duplicate 160) frames, the AP receiver 1310 may use the primary 80 MHz channel only (because no L-LTF channel estimation is done on the secondary 80 MHz channel). In some examples, 160 MHz RTT processing may not be possible because the VHT channel estimates of each segment come from different receive antennas. The 160 MHz RTT or the 80+80 RTT may require the AP receiver 1310 to include extra 80 MHz chains (e.g., at least up to and including the channel estimation) to make sure that on at least two receive antennas is obtained to get an 80 MHz channel estimate (e.g., one receive antenna on the primary 80 MHz channel and one receive antenna on the secondary 80 MHz channel).

In some examples, the wireless device 1305 may correct for potential phase discontinuities in legacy duplicate 40/80/160 packets between 20 MHz sub-channels at the transmitter 1320 and between the primary 80 MHz channel and the secondary 80 MHz channel at both the transmitter 1320 and the receiver 1310. A management message indicates the listening mode to a physical (PHY) layer. In some examples, the management message may be a media access control (MAC) message. The receiver may be reconfigured based on an expected data packet type that may be conveyed in the management message. For example, the configuration of the receiver 1310 may be adjusted in order that the receiver 1310 may be capable of receiving an expected data packet type based on the management message.

The AP bandwidth selector 1315 may switch the wireless device 1305 between operating in one or more bandwidth modes, including a 20, 40, 80, 80+80, 160 contiguous, and 165 MHz bandwidth modes. The AP bandwidth selector 1315 may cause the wireless device 1305 to advertise support by a wireless device for the different bandwidth modes. The AP bandwidth selector 1315 may also adjust the number of MIMO spatial streams currently used by the wireless device 1305 in response to the selected bandwidth mode.

The AP transmitter 1320 may be one or more aspects of the transmitter 600 of FIG. 6. The AP transmitter 1320 may transmit the one or more signals received from other components of the wireless device 1305, for example, a bandwidth support message 305 or a bandwidth identification message 310. The AP transmitter 1320 may include components that enable channel bonding between a plurality of channels. The AP transmitter 1320 may transmit one or more data packets at 160 MHz or 165 MHz, for example. In some examples, the AP transmitter 1320 may be collocated with the receiver 1310 in a transceiver.

Figure 14:
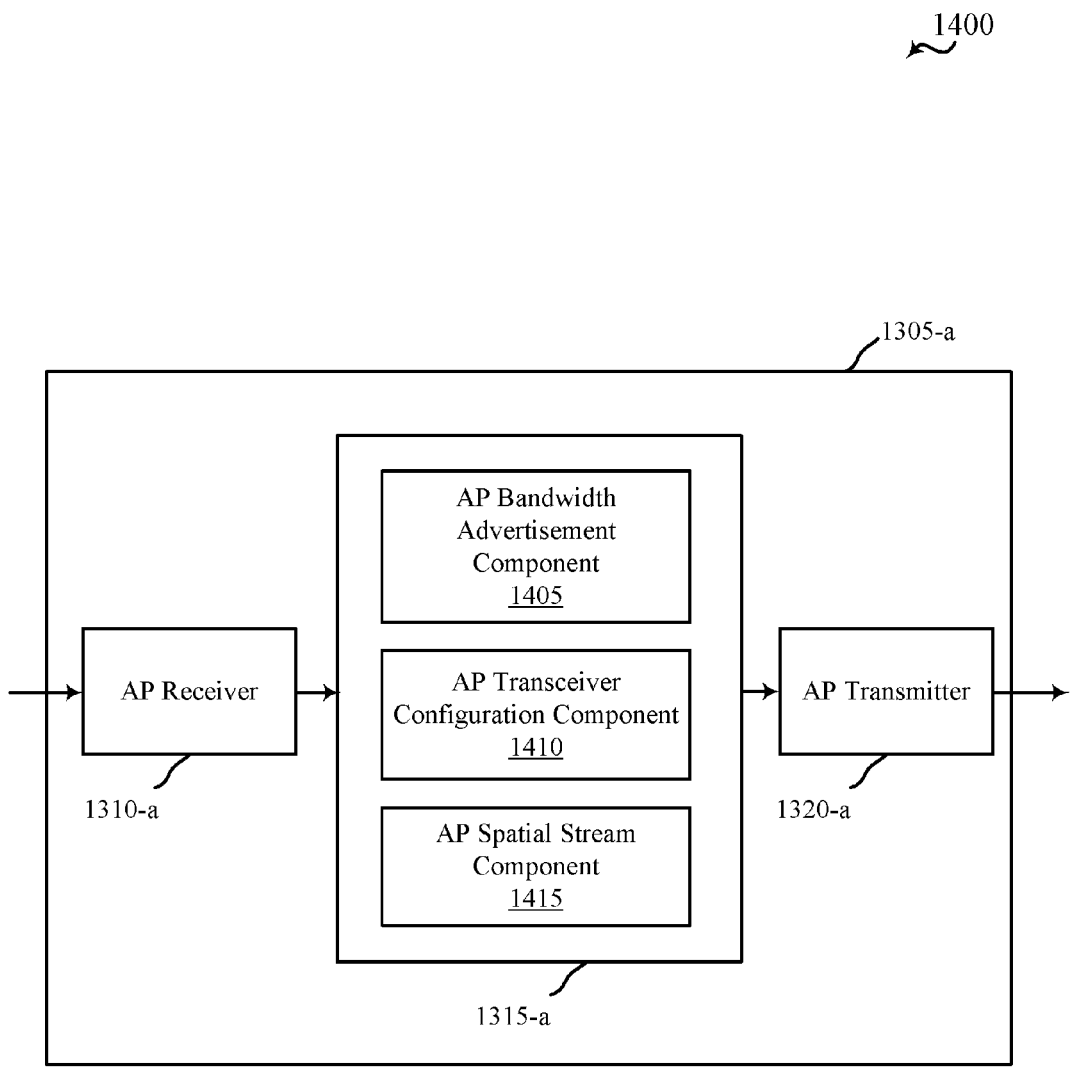
FIG. 14 shows a block diagram of a device configured for use in wireless communication, in accordance with various aspects of the present disclosure.

FIG. 14 shows a block diagram 1400 of a wireless device 1305-*a* that is used in an AP for wireless communication, in accordance with various examples. The wireless device 1305-*a* may be an example of one or more aspects of the APs 105 described with reference to FIGS. 1 and 3-5. It may also be an example of a wireless device 1305 described with reference to FIG. 13. The wireless device 1305-*a* may include an AP receiver 1310-*a*, AP bandwidth selector 1315-*a*, or an AP transmitter 1320-*a*, which may be examples of the corresponding modules of the wireless device 1305. The wireless device 1305-*a* may also include a processor. Each of these modules may be in communication with each other. The AP bandwidth selector 1315-*a* may include an AP bandwidth advertisement component 1405, an AP transceiver configuration component 1410, and an AP spatial stream component 1415. The AP receiver 1310-*a* and the AP transmitter 1320-*a* may perform the functions of the AP receiver 1310 and the AP transmitter 1320, of FIG. 13, respectively.

The components of the wireless device 1305-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The AP bandwidth advertisement component 1405 causes the wireless device 1305-*a* to send bandwidth support messages to one or more client wireless devices 110 and other APs 105. The AP bandwidth advertisement component 1405 may also interpret a bandwidth support message received at the AP receiver 1310-*a*. Based on an identified bandwidth in the bandwidth support message, the AP bandwidth selector 1315-*a* may select a current bandwidth mode to match the identified bandwidth.

The AP transceiver configuration component 1410 may update the AP receiver 1310-*a* or the transmitter 1320-*a* based on the selected bandwidth mode. The AP spatial stream component 1415 may adjust the MIMO spatial streams used based on the selected bandwidth mode.

Figure 15A:
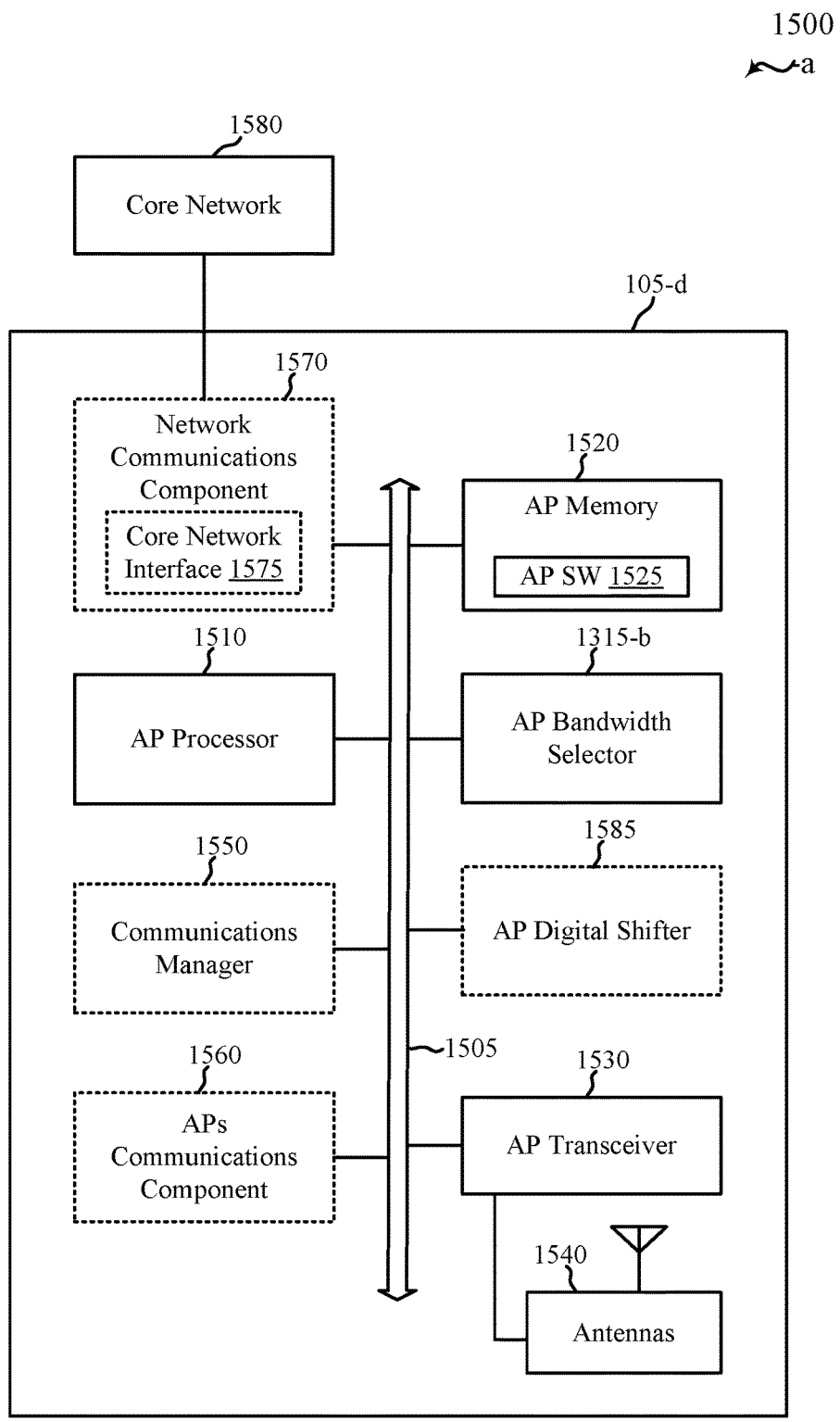
FIGS. 15A and 15B show block diagrams of a wireless communication system, in accordance with various aspects of the present disclosure.

Turning to FIG. 15A, a diagram 1500-*a* is shown that illustrates an access point or AP 105-*d* configured for operating in one or more bandwidth modes, including an 80+80, 160 contiguous, and 165 MHz bandwidth modes. In some aspects, the AP 105-*d* may be an example of the APs 105 of FIGS. 1 and 3-5. The AP 105-*d* may include an AP processor 1510, an AP memory 1520, an AP transceiver 1530, antennas 1540, and an AP bandwidth selector 1315-*b*. The AP bandwidth selector 1315-*b* may be an example of the AP bandwidth selector 1315 of FIGS. 13 and 14. In some examples, the AP 105-*d* may also include one or both of an APs communications manager 1550, an AP communications component 1560, and an AP network communications component 1570. The AP network communications component 1570 may further include an AP code network interface 1575. Each of these components may be in communication with each other, directly or indirectly, over at least one bus 1505.

The AP memory 1520 may include random access memory (RAM) and read-only memory (ROM). The AP memory 1520 may also store computer-readable, computer-executable software (SW) code 1525 containing instructions that are configured to, when executed, cause the AP processor 1510 to perform various functions described herein for using different bandwidth modes such as the 80+80, 160, and 165 MHz bandwidth modes, for example. Alternatively, the software code 1525 may not be directly executable by the AP processor 1510 but be configured to cause the computer, e.g., when compiled and executed, to perform functions described herein.

The AP processor 1510 may include an intelligent hardware device, e.g., a central processing unit (CPU), a microcontroller, an ASIC, and the like. The AP processor 1510 may process information received through the AP transceiver 1530, the APs communications component 1560, and/or the AP network communications component 1570. The AP processor 1510 may also process information to be sent to the AP transceiver 1530 for transmission through the antennas 1540, to the APs communications component 1560, and/or to the AP network communications component 1570. The AP processor 1510 may handle, alone or in connection with the AP bandwidth selector 1315-*b*, various aspects related to channel bonding to support 80+80, 160, and 165 MHz bandwidth modes.

The AP transceiver 1530 may include a modem configured to modulate the packets and provide the modulated packets to the antennas 1540 for transmission, and to demodulate packets received from the antennas 1540. The AP transceiver 1530 may be implemented as at least one transmitter module and at least one separate receiver module. The AP transceiver 1530 may be configured to communicate bi-directionally, via the antennas 1540, with at least one wireless device 110 as illustrated in FIGS. 1, 3, and 4, for example. The AP 105-*d* may typically include multiple antennas 1540 (e.g., an antenna array). The AP 105-*d* may communicate with an AP core network 1580 through the AP network communications component 1570. The AP 105-*d* may communicate with other APs as well, using an APs communications component 1560.

According to the architecture of FIG. 15A, the AP 105-*d* may further include a AP communications manager 1550. The AP communications manager 1550 may manage communications with stations and/or other devices as illustrated in the WLAN network 100 of FIG. 1. The AP communications manager 1550 may be in communication with some or all of the other components of the AP 105-*d* via the bus or buses 1505. Alternatively, functionality of the AP communications manager 1550 may be implemented as a component of the AP transceiver 1530, as a computer program product, and/or as at least one controller element of the AP processor 1510.

The AP 105-*d* may further include a digital shifter 1385. The digital shifter 1385 may shift frequencies of one or more channels or chains, such as by ±40 or 45 MHz. In some examples, the digital shifter 1385 is part of the AP transceiver 1530.

The components of the AP 105-*d* may be configured to implement aspects discussed above with respect to FIGS. 1-14, and those aspects may not be repeated here for the sake of brevity. Moreover, the components of the AP 105-*d* may be configured to implement aspects discussed below with respect to FIGS. 19 and 20 and those aspects may not be repeated here also for the sake of brevity.

Figure 15B:
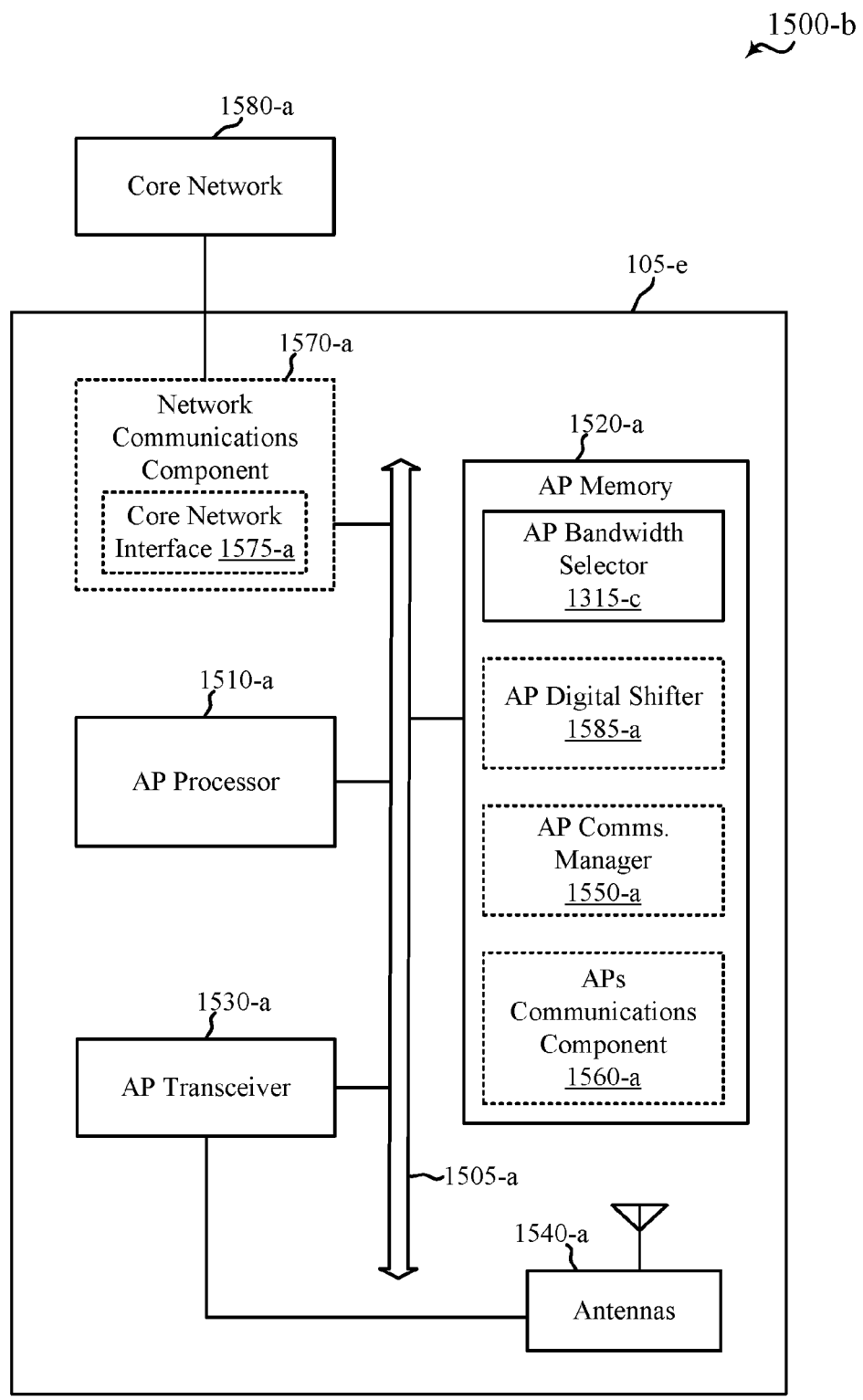

Turning to FIG. 15B, a diagram 1500*b* is shown that illustrates an access point or AP 105-*e* configured for operating in one or more bandwidth modes, including an 80+80, 160 contiguous, and 165 MHz bandwidth modes. In some aspects, the AP 105-*e* may be an example of the APs 105 of FIGS. 1, 3-5, and 15A. Similar to the AP 105-*d* of FIG. 15A, the AP 105-*e* may include an AP processor 1510-*a*, an AP memory 1520-*a*, an AP transceiver 1530-*a*, antennas 1540-*a*, and an AP bandwidth selector 1315-*c*, which may perform the functions of the corresponding components in FIG. 15A.

The AP bandwidth selector 1315-*c* may be an example of the AP bandwidth selector 1315 of FIGS. 13-15A. In some examples, the AP 105-*e* may also include one or both of an AP communications manager 1550-*a*, an AP communications component 1560-*a*, and an AP network communications component 1570-*a*, which may perform the functions of the corresponding components in FIG. 15A. The AP network communications component 1570-*a* may further include an AP code network interface 1575-*a*. Each of these components may be in communication with each other, directly or indirectly, over at least one bus 1505-*a*.

The example of FIG. 15B illustrates the AP bandwidth selector 1315-*a*, an AP digital shifter 1538-*a*, the AP communications manager 1550-*a*, and the AP communications component 1560-*a* as software stored in the AP memory 1520-*a*. The AP memory 1520-*a* may store these components as computer-readable, computer-executable software code containing instructions that are configured to, when executed, cause the AP processor 1510-*a* to perform various functions described herein for using different bandwidth modes such as the 80+80, 160, and 165 MHz bandwidth modes, for example. Alternatively, the AP bandwidth selector 1315-*a*, the AP digital shifter 1538-*a*, the AP communications manager 1550-*a*, and the AP communications component 1560-*a* may not be directly executable by the AP processor 1510-*a* but be configured to cause the computer, e.g., when compiled and executed, to perform functions described herein.

The components of the AP 105-*e* may be configured to implement aspects discussed above with respect to FIGS. 1-8 and 15A, and those aspects may not be repeated here for the sake of brevity. Moreover, the components of the AP 105-*e* may be configured to implement aspects discussed below with respect to FIGS. 19 and 20 and those aspects may not be repeated here also for the sake of brevity.

Figure 16:
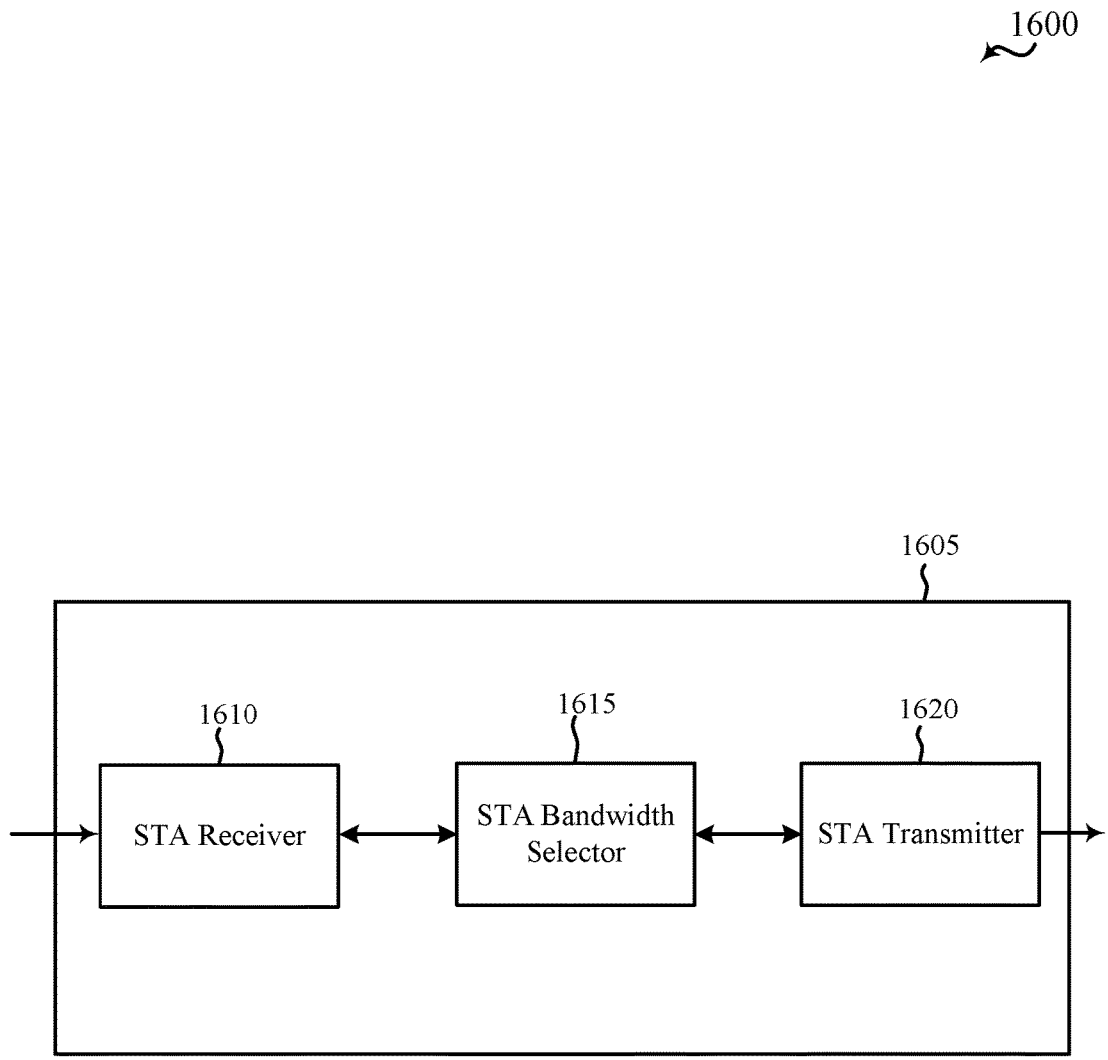
FIG. 16 shows a block diagram of an apparatus for use in wireless communication, in accordance with various aspects of the present disclosure.

FIG. 16 shows a block diagram 1600 of a wireless device 1605 for use in a station for wireless communication, in accordance with various aspects of the present disclosure. In some examples, the wireless device 1605 may be an example of aspects of one or more of the wireless devices 110 described with reference to FIGS. 1 and 3-5. The wireless device 1605 may also be or include a processor. The wireless device 1605 may include a STA receiver 1610, a STA bandwidth selector 1615, or a STA transmitter 1620. Each of these modules may be in communication with each other.

The wireless device 1605, through the STA receiver 1610, the STA bandwidth selector 1615, or the STA transmitter 1620, may be configured to perform functions described herein. For example, the wireless device 1605 may be configured to perform various aspects related to channel bonding to support 80+80, 160, and 165 MHz bandwidth modes.

The components of the wireless device 1605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

The STA receiver 1610 may receive information such as packets, user data, or control information associated with various information channels (e.g., control channels, data channels, etc.). The STA receiver 1610 may be configured to receive data packets over various frequencies, bandwidth support messages, and bandwidth identification messages. Information may be passed on to the STA bandwidth selector 1615, and to other components of the wireless device 1605.

The STA bandwidth selector 1615 may be configured to implement aspects discussed above with respect to the AP bandwidth selector 1315 of FIGS. 13-15, and those aspects may not be repeated here for the sake of brevity.

The STA transmitter 1620 may transmit the one or more signals received from other components of the wireless device 1605. The STA transmitter 1620 may transmit data packets over various frequencies, bandwidth support messages, and bandwidth identification messages. In some examples, the STA transmitter 1620 may be collocated with the STA receiver 1610 in a transceiver. The STA transmitter 1620 may include a single antenna, or it may include a plurality of antennas.

Figure 17:
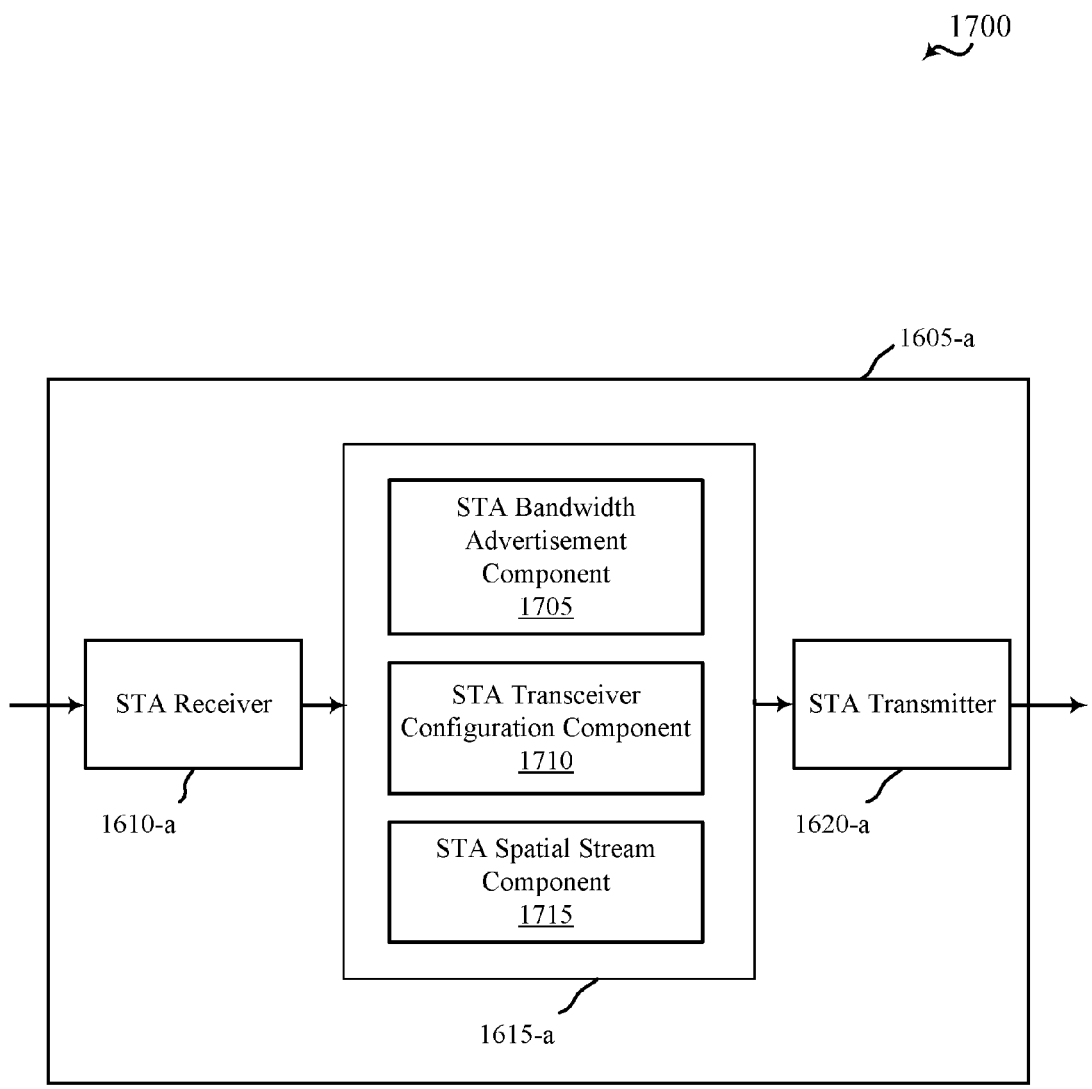
FIG. 17 shows a block diagram of an apparatus for use in wireless communication, in accordance with various aspects of the present disclosure.

FIG. 17 shows a block diagram 1700 of a wireless device 1605-a that is used in a wireless device for wireless communication, in accordance with various examples. The wireless device 1605-a may be an example of one or more aspects of a wireless device 110 described with reference to FIGS. 1 and 3-5. It may also be an example of a wireless device 1605 described with reference to FIG. 16. The wireless device 1605-a may include a STA receiver 1610-a, a STA bandwidth selector 1615-a, or a STA transmitter 1620-a, which may be examples of the corresponding modules of wireless device 1605. The wireless device 1605-a may also include a processor. Each of these components may be in communication with each other. The STA bandwidth selector 1615-a may include a STA bandwidth advertisement component 1705, a STA transceiver configuration component 1710, and a STA spatial stream component 1715. The STA receiver 1610-a and the STA transmitter 1620-a may perform the functions of the STA receiver 1610 and the STA transmitter 1620, of FIG. 16, respectively.

The STA bandwidth advertisement component 1705, the STA transceiver configuration component 1710, and the STA spatial stream component 1715 may be configured to implement aspects discussed above with respect to the AP bandwidth advertisement component 805, the AP transceiver configuration component 810, and the AP spatial stream component 815 of FIG. 8, and those aspects may not be repeated here for the sake of brevity.

Figure 18A:
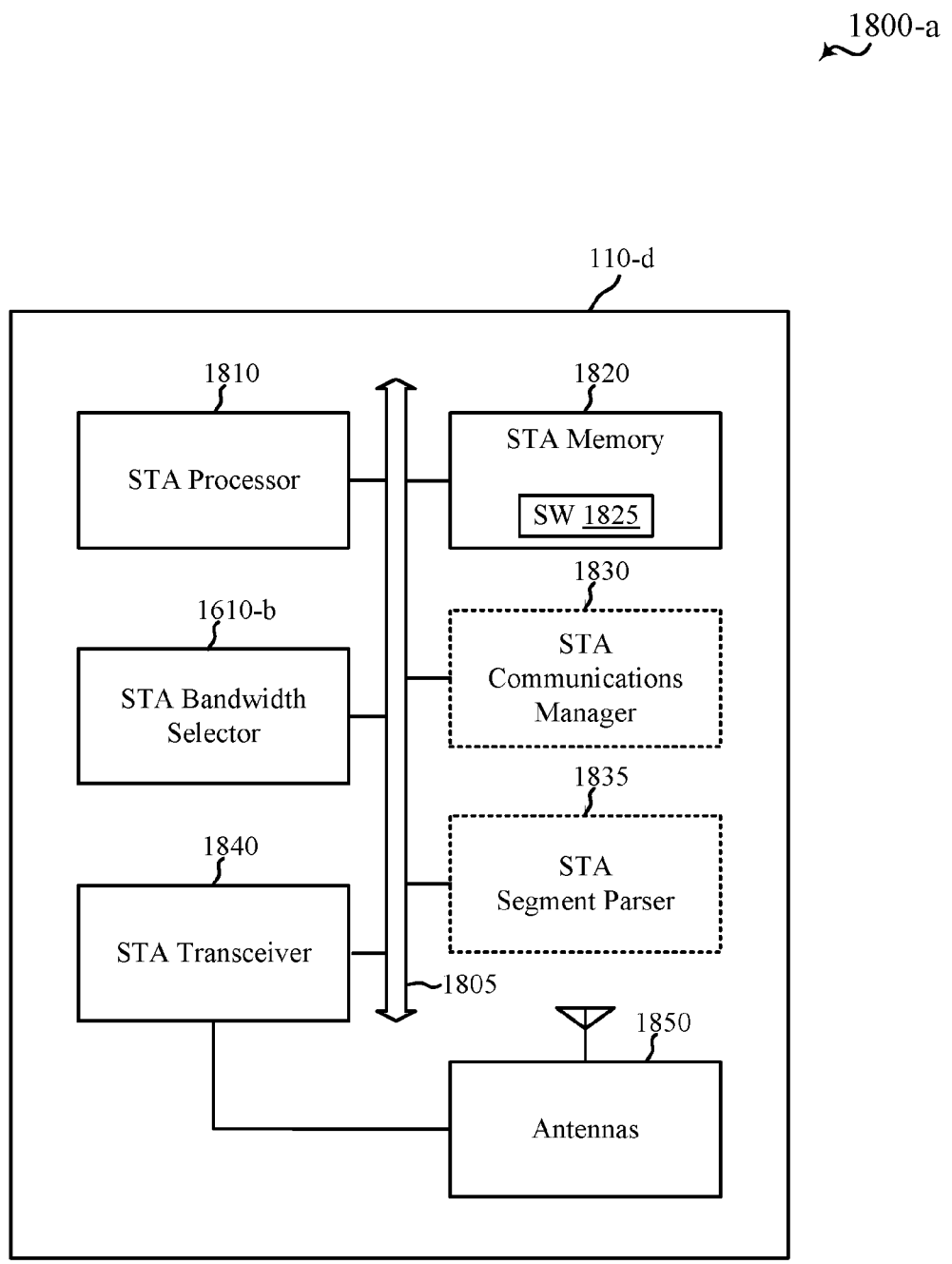
FIGS. 18A and 18B show block diagrams of a wireless device for use in wireless communication, in accordance with various aspects of the present disclosure.

Turning to FIG. 18A, a diagram 1800-a is shown that illustrates a wireless device 110-d configured for operating in multiple bandwidth modes, including a 20, 40, 80, 80+80, 160, and 165 MHz bandwidth modes. The wireless device 110-d may have various other configurations and may be included or be part of a personal computer (e.g., laptop computer, netbook computer, tablet computer, etc.), a cellular telephone, a PDA, a digital video recorder (DVR), an interne appliance, a gaming console, an e-readers, and the like. The wireless device 110-d may have an internal power supply, such as a small battery, to facilitate mobile operation. The wireless device 110-d may be an example of the wireless devices 110 of FIGS. 1 and 3-5.

The wireless device 110-d may include a STA processor 1810, a STA memory 1820, a STA transceiver 1840, antennas 1850, and a STA bandwidth selector 1615-b. The STA bandwidth selector 1615-b may be an example of the STA bandwidth selector 1615 of FIGS. 16 and 17. Each of these components may be in communication with each other, directly or indirectly, over at least one bus 1805.

The STA memory 1820 may include RAM and ROM. The STA memory 1820 may store computer-readable, computer-executable software (SW) code 1825 containing instructions that are configured to, when executed, cause the STA processor 1810 to perform various functions described herein for channel bonding. Alternatively, the software code 1825 may not be directly executable by the STA processor 1810 but be configured to cause the computer (e.g., when compiled and executed) to perform functions described herein.

The STA processor 1810 may include an intelligent hardware device, e.g., a CPU, a microcontroller, an ASIC, and the like. The STA processor 1810 may process information received through the STA transceiver 1840 or to be sent to the STA transceiver 1840 for transmission through the antennas 1850. The STA processor 1810 may handle, alone or in connection with the STA bandwidth selector 1615-b, various related to channel bonding to support 80+80, 160, and 165 MHz bandwidth modes.

The STA transceiver 1840 may be configured to communicate bi-directionally with APs 105 in FIGS. 1, 3-5, and 15. The STA transceiver 1840 may be implemented as at least one transmitter and at least one separate receiver. The STA transceiver 1840 may include a modem configured to modulate the packets and provide the modulated packets to the antennas 1850 for transmission, and to demodulate packets received from the antennas 1850. While the wireless device 110-d may include multiple antennas, there may be aspects in which the wireless device 110-d may include a single antenna 1850.

According to the architecture of FIG. 18, the wireless device 110-d may further include a STA communications manager 1830. The STA communications manager 1830 may manage communications with various access points. The STA communications manager 1830 may be a component of the wireless device 110-d in communication with some or all of the other components of the wireless device 110-d over the at least one bus 1805. Alternatively, functionality of the STA communications manager 1830 may be implemented as a component of the STA transceiver 1840, as a computer program product, or as at least one controller element of the STA processor 1810.

The wireless device 110-d may further include a STA segment parser 1835. The STA segment parser 1835 may parse bandwidth segments in order to perform channel bonding, such as in the 80+80 bandwidth mode. In some examples, the STA segment parser 1835 is part of the STA transceiver 1840.

The components of the wireless device 110-d may be configured to implement aspects discussed above with respect to FIGS. 1-6, 16, and 17, and those aspects may not be repeated here for the sake of brevity. Moreover, the components of the wireless device 110-d may be configured to implement aspects discussed below with respect to FIGS. 19 and 20, and those aspects may not be repeated here also for the sake of brevity.

Figure 18B:
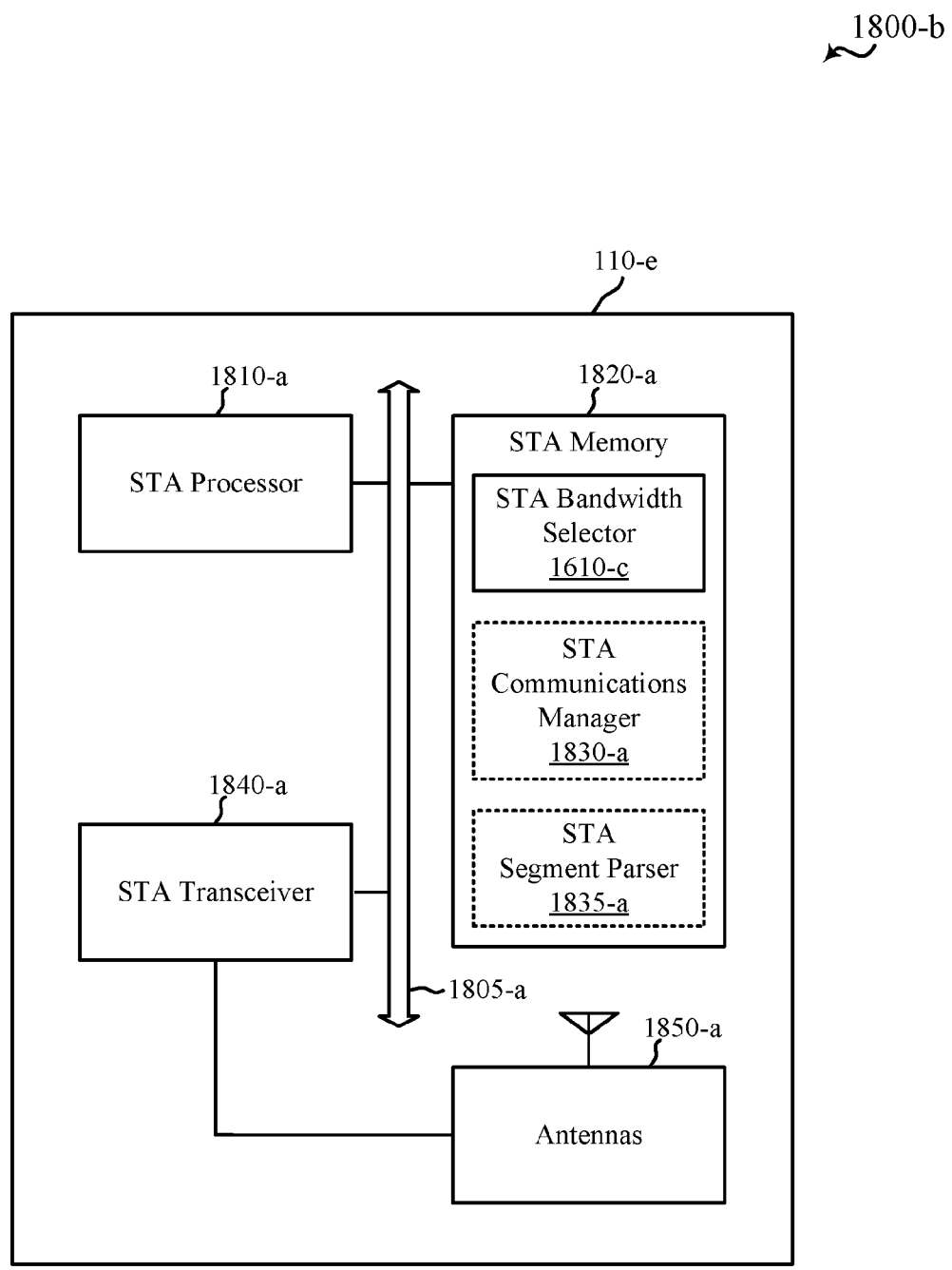

FIG. 18B shows a diagram 1800-b that illustrates a wireless device 110-e configured for operating in multiple bandwidth modes, including a 20, 40, 80, 80+80, 160, and 165 MHz bandwidth modes. The wireless device 110-e may be an example of the wireless devices 110 of FIGS. 1, 3-5, and 18A.

The wireless device 110-e may include a STA processor 1810-a, a STA memory 1820-a, a STA transceiver 1840-a, antennas 1850-a, and a STA bandwidth selector 1615-c. The STA bandwidth selector 1615-*c* may be an example of the STA bandwidth selector 1615 of FIGS. 16, 17, and 18A. Each of these components may be in communication with each other, directly or indirectly, over at least one bus 1805-*a*. The components of the wireless device 110-*e* may perform the functions of the corresponding components in FIG. 18A.

The STA memory 1820-*a* may store computer-readable, computer-executable software code containing instructions that are configured to, when executed, cause the STA processor 1810-*a* to perform various functions described herein for channel bonding. The STA memory 1820-*a* may include the STA bandwidth selector 1615-*c*, a STA communications manager 1830-*a*, and a STA segment parser 1835-*a*, which may perform the functions of the corresponding components in FIG. 18A. Alternatively, the STA bandwidth selector 1615-*c*, the STA communications manager 1830-*a*, and the STA segment parser 1835-*a* may not be directly executable by the STA processor 1810 but be configured to cause the computer (e.g., when compiled and executed) to perform functions described herein. The STA processor 1810-*a* may handle, alone or in connection with the STA bandwidth selector 1615-*c*, various related to channel bonding to support 80+80, 160, and 165 MHz bandwidth modes.

The components of the wireless device 110-*e* may be configured to implement aspects discussed above with respect to FIGS. 1-6, 16-17, and 18A, and those aspects may not be repeated here for the sake of brevity. Moreover, the components of the wireless device 110-*e* may be configured to implement aspects discussed below with respect to FIGS. 19 and 20, and those aspects may not be repeated here also for the sake of brevity.

Figure 19:
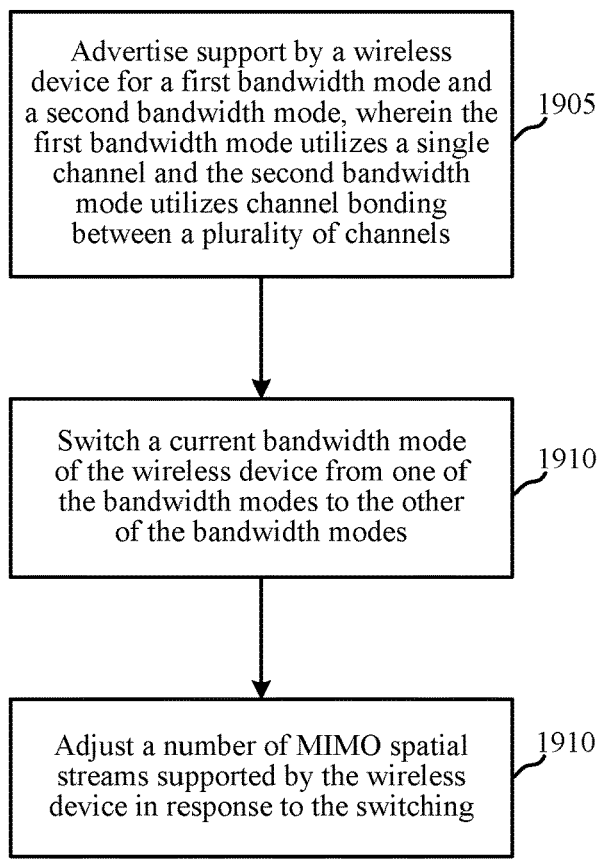
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the APs 105 or wireless devices 110 described with reference to FIGS. 1, 3-5, 15, and 18, or aspects of one or more of the wireless devices 1305, 1605 described with reference to FIGS. 13, 8, 16, and 17. In some examples, an AP 105 or wireless device 110 may execute one or more sets of codes to control the functional elements of the AP 105 or wireless device 110 to perform the functions described below. Additionally or alternatively, the AP 105 or wireless device 110 may perform one or more of the functions described below using-purpose hardware. For illustrative purposes, FIG. 19 is discussed in terms of an AP 105. However, a wireless device 110 may also perform the functions described below.

At block 1905, the method 1900 may include advertising support by a wireless device for a first bandwidth mode and a second bandwidth mode, wherein the first bandwidth mode utilizes a single channel and the second bandwidth mode utilizes channel bonding between a plurality of channels. The AP 105 may advertise support for the bandwidth modes may be advertised by sending a bandwidth support message or a bandwidth identification message via a transmitter, such as the transmitter 600 of FIG. 6.

At block 1910, the method 1900 may include switching a current bandwidth mode of the wireless device from one of the bandwidth modes to the other of the bandwidth modes. In some examples, switching the current bandwidth mode of the wireless device includes switching from the first bandwidth mode to the second bandwidth mode. In other examples, switching the current bandwidth mode of the wireless device includes switching from the second bandwidth mode to the first bandwidth mode. In another example, adjusting the number of MIMO spatial streams includes increasing the number of MIMO spatial streams supported by the wireless device.

Advertising support by the wireless device for the first bandwidth mode and the second bandwidth mode may include signaling a response frame including an OMN element. The OMN element may indicate a parameter selected from the group consisting of an operating bandwidth of the single channel and the number of MIMO spatial streams supported by the wireless device. In some examples, the OMN element may indicate a reduced support of MIMO spatial streams than the number of spatial streams that the wireless device is capable of supporting. For example, if the wireless device has VHT capabilities and supports four spatial streams in the 160 MHz bandwidth mode, but a second wireless device to which it associates only supports two spatial streams in the 160 MHz bandwidth mode, the second wireless device may send an OMN to reduce its support to only two spatial streams in the 160 MHz bandwidth mode for communication with the wireless device.

At block 1915, the method 1900 may include adjusting a number of MIMO spatial streams supported by the wireless device in response to the switching. In some examples, adjusting the number of MIMO spatial streams may include reducing the number of MIMO spatial streams supported by the wireless device. For example, the AP 105 may reduce the number of MIMO spatial streams being used from four to two. In some examples, the number of MIMO spatial streams may be adjusted in proportion to an increase or decrease in bandwidth associated with switching the current bandwidth mode of the wireless device.

The method 1900 may further include adjusting sampling rates of one or more ADCs of the wireless device in response to the switching. The adjusted sampling rate may be done dynamically or statically. In a dynamic example, adjusting the sampling rates of the one or more ADCs may include doubling or halving the sampling rates in response to switching the current bandwidth mode from the first bandwidth mode to the second bandwidth mode. In a static example, the chains that may be needed to process the second channel (e.g., the secondary 80 MHz segment) could already be at double the sampling rate from the start of the data packet. In that case, when switching modes, the adjustment may include selecting the proper segment by means of mixing and filtering.

In some examples of the method 1900, switching the current bandwidth mode of the wireless device includes adjusting a number of synthesizers used by the wireless device.

The method 1900 may also include adjusting a number of receive chains used for the plurality of channels based on a listening mode or a data demodulation mode. In some examples, adjusting the number of receive chains includes one of increasing a number of receive chains used for a primary channel of the plurality of channels and decreasing a number of receive chains used for a secondary channel of the plurality of channels and decreasing the number of receive chains used for the primary channel and increasing the number of receive chains used for the secondary channel.

In examples where the method 1900 includes receiving a data packet at the wireless device, adjusting the number of receive chains used for the plurality of channels may be further based on a type of the data packet, a bandwidth of the data packet, or combinations thereof. In examples where the method 1900 includes receiving a data packet at the wireless device, switching the current bandwidth mode happens in one of a symbol after the wireless device determines a packet format of the data packet and in a symbol used for updating a gain level. For example, the method 1900 may perform the switching in a symbol after the packet format is known (e.g., after the HT-SIGs of 802.11n, or after the VHT-SIGs of 802.11ac). In another example, the method 1900 may perform the switching in a symbol used for updating the radio frequency or baseband gain (e.g., the HT-STF of 802.11n, or the VHT-STF of 802.11ac).

In some examples, a management message may indicate the listening mode to a physical layer. In some examples, the management message may be a MAC message. The method 1900 may include adjusting a configuration of a receiver based at least in part on an expected data packet type identified in the management message. For example, the configuration of the receiver of the wireless device for reception of an expected data packet type may be based on the management message.

The method 1900 may further include determining that an acknowledgement having a bandwidth equal to or less than a bandwidth of the single channel is expected at the wireless device from a different, second wireless device. The method 1900 may also include adjusting the number of received chains used for the single channel in response to the determination and based at least in part on a management message that indicates a number of receive chains used for the single channel to a physical layer or a number of frequency segments associated with the single channel.

The operation(s) at block 1905 may be performed using the AP bandwidth selector 1315 or the STA bandwidth selector 1615 described with reference to FIGS. 13, 8, 16, and 17.

Thus, the method 1900 may provide for wireless communication. It should be noted that the method 1900 is just one implementation and that the operations of the method 1900 may be rearranged or otherwise modified such that other implementations are possible.

Figure 20:
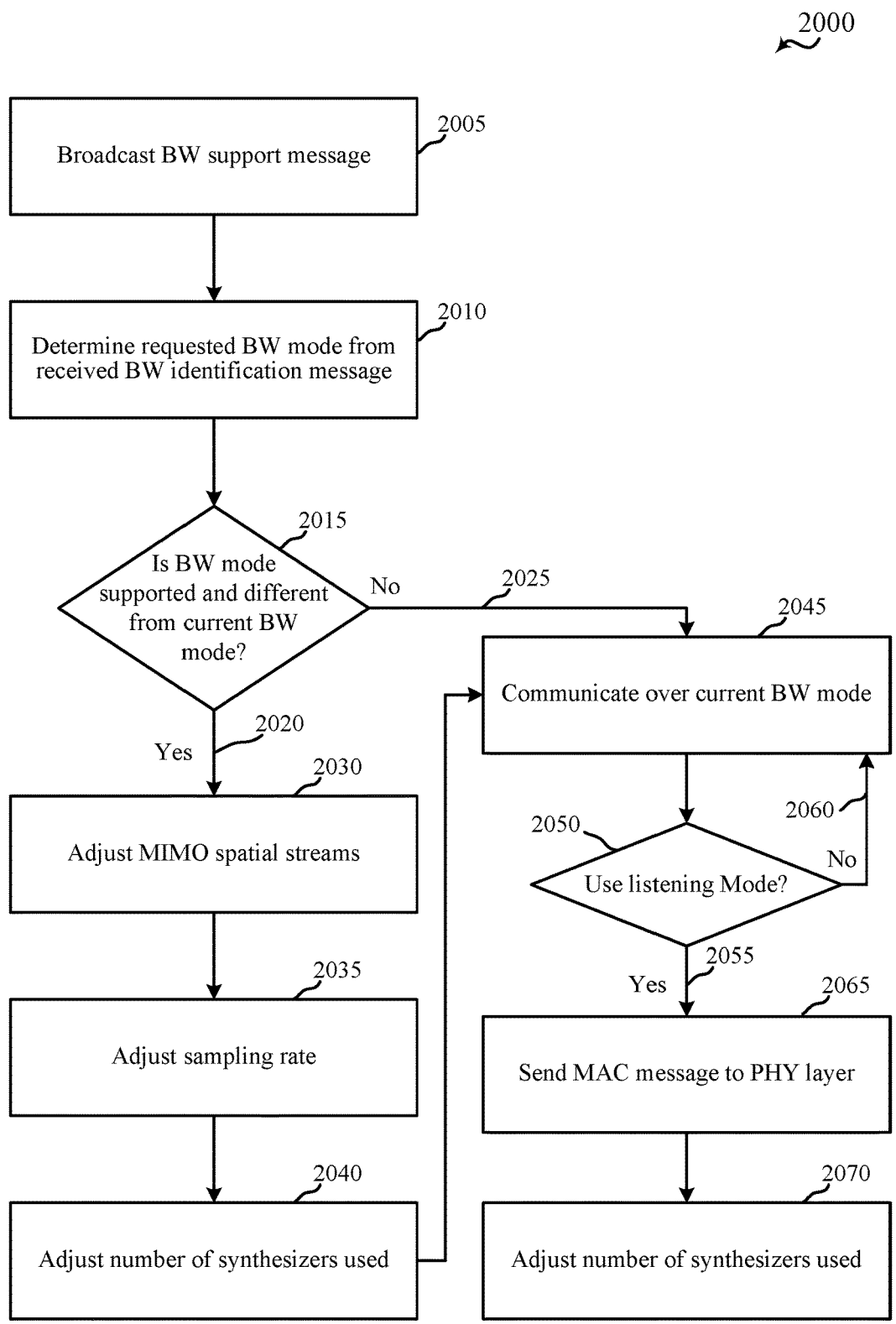
FIG. 20 is a flow chart illustrating an example of a method for wireless communication, in accordance with various aspects of the present disclosure.

FIG. 20 is a flow chart illustrating an example of a method for wireless communication, in accordance with various aspects of the present disclosure. For clarity, the method 2000 is described below with reference to aspects of one or more of the APs 105 or wireless devices 110 described with reference to FIGS. 1, 3-5, 15, and 18, or aspects of one or more of the wireless devices 1305, 1605 described with reference to FIGS. 13, 8, 16, and 17. In some examples, an AP 105 or wireless device 110 may execute one or more sets of codes to control the functional elements of the AP 105 or wireless device 110 to perform the functions described below. Additionally or alternatively, the AP 105 or wireless device 110 may perform one or more of the functions described below using-purpose hardware. For illustrative purposes, FIG. 20 is discussed in terms of an AP 105. However, a wireless device 110 may also perform some or all of the functions described below.

At block 2005, the method 2000 may include broadcasting a bandwidth (BW) support message. The bandwidth support message may include an OMN element as described above.

At block 2010, the method 2000 may include determining a requested bandwidth mode from a bandwidth identification message that the AP 105 received. The AP 105 may be operating in a first bandwidth mode at the time the AP 105 received the bandwidth identification message from a client, such as a wireless device 110. At decision block 2015, the method 2000 may include determining whether the requested bandwidth mode is supported and different from bandwidth mode that the AP 105 is currently operating in or configured to. If the requested bandwidth mode is the same as the current bandwidth mode or if the AP 105 does not support the requested bandwidth mode, the method 2000 follows the path 2025 to block 2045. At block 2045, the method 2000 may include communicating with the requesting device over the current bandwidth mode, which in this case, is the same as the previous bandwidth mode. In some examples, the method 2000 may not communicate with the requesting device over the current bandwidth mode if, for example, the requesting device does not support the current bandwidth mode.

If the requested bandwidth mode is not the same as the current bandwidth mode and the AP 105 supports the requested bandwidth mode, the method 2000 proceeds along path 2020 to block 2030. For blocks 2030, 2035, and 2040, the method 2000 performs steps for changing the current bandwidth mode to the requested bandwidth mode. At block 2030, the method 2000 may include adjusting the MIMO spatial streams of the AP 105. For example, the AP 105 may reduce the spatial streams used from four to two. At block 2035, the method 2000 may adjust the sampling rate of DACs in the one or more transceivers. At block 2040, the method 2000 may adjust the number of synthesizers used in the one or more transceivers. In some examples, the method 2000 includes a subset of the blocks 2030, 2035, and 2040.

Once the AP 105 is operating in the requested bandwidth mode, which is now the current bandwidth mode, the method 2000 proceeds to block 2045 where the AP 105 communicates with the requesting wireless device 110 via the current (i.e., requested) bandwidth mode.

At block 2050, the method 2000 includes querying whether the AP 105 should use a listening mode. If not, the method 2000 continues to communicate with the requesting wireless device 110 along path 2060. If so, the method 2000 further proceeds along path 2055 to include sending a MAC message to a PHY layer to inform the PHY layer to adjust for the listening mode. At block 2070, the method 2000 may adjust the number of synthesizers used in order use the listening mode. In some examples, the method 2000 may continue to communicate with the requesting wireless device 110 over the current bandwidth mode.

Figure 21:
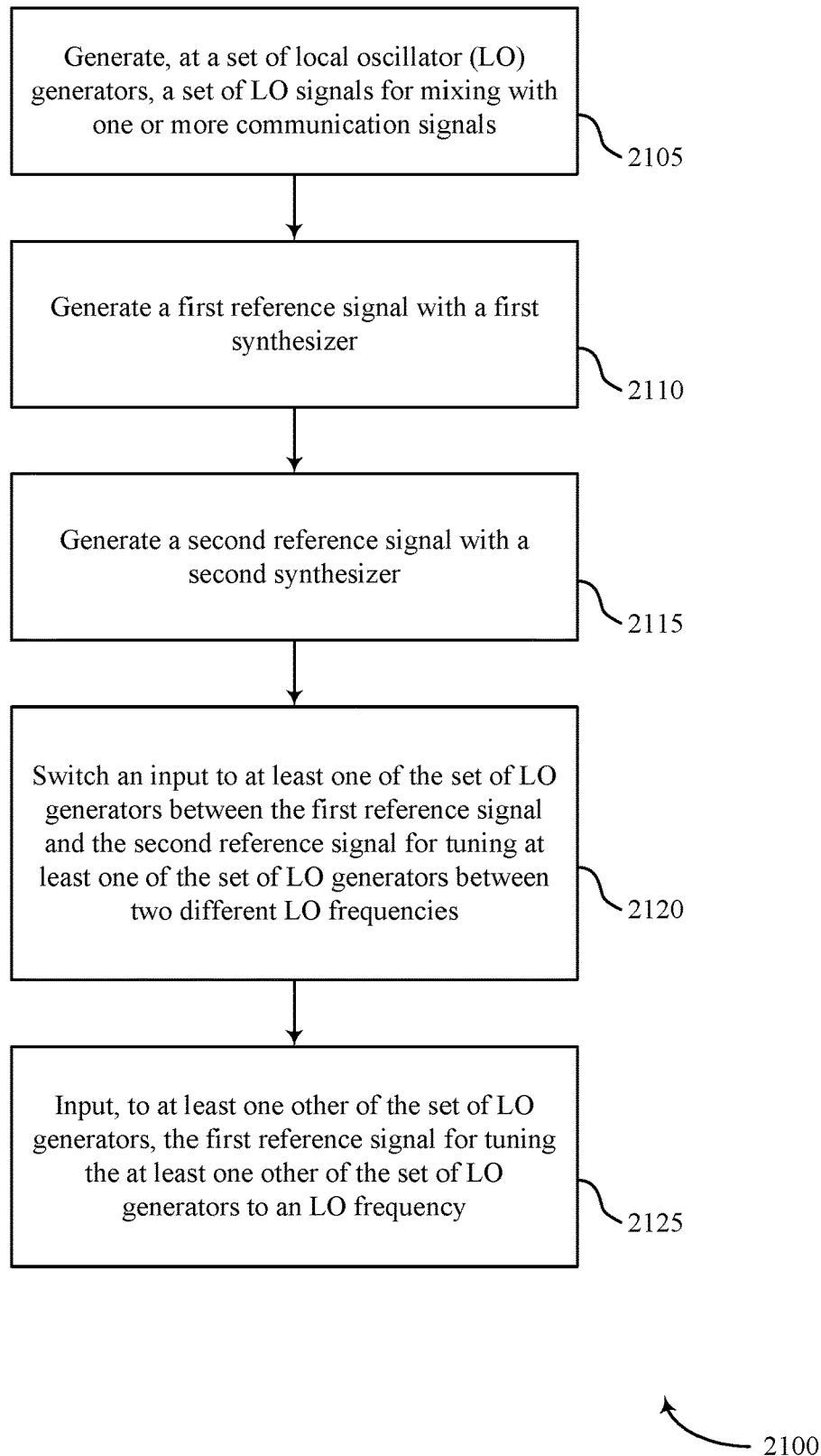
FIG. 21 illustrates an example of a method for wireless communication, in accordance with various aspects of the present disclosure.

FIG. 21 shows a flowchart illustrating a method 2100 for wireless communication, in accordance with various aspects of the present disclosure. The operations of method 2100 may be implemented by a device such as an AP 105 or wireless device 110 or its components as described with reference to FIGS. 1, 3-5, 7-9, and 13-18B. In some examples, the wireless device 110 or AP 105 may execute a set of codes to control the functional elements of the device to perform the functions described below. Additionally or alternatively, the AP 105 or wireless device 110 may perform aspects the functions described below using special-purpose hardware. For illustrative purposes, FIG. 21 is discussed in terms of an AP 105. However, a wireless device 110 may also perform the functions described below.

At block 2105, the method 2100 may include generating, at a set of local oscillator (LO) generators, a set of LO signals for mixing with one or more communication signals as described above with reference to FIGS. 7 through 12. In certain examples, the operations of block 2105 may be performed by the LO generator 940 as described with reference to FIG. 9.

At block 2110, the method 2100 may include generating a first reference signal with a first synthesizer as described above with reference to FIGS. 7 through 12. In certain examples, the operations of block 2110 may be performed by the synthesizer 910 as described with reference to FIG. 9.

At block 2115, the method 2100 may include generating a second reference signal with a second synthesizer as described above with reference to FIGS. 7 through 12. In certain examples, the operations of block 2115 may be performed by the synthesizer 910 as described with reference to FIG. 9.

At block 2120, the method 2100 may include switching an input to at least one of the set of LO generators between the first reference signal and the second reference signal for tuning at least one of the set of LO generators between two different LO frequencies as described above with reference to FIGS. 7 through 12. In certain examples, the operations of block 2120 may be performed by the distribution circuit 930 as described with reference to FIG. 9.

At block 2125, the method 2100 may include inputting, to at least one other of the set of LO generators, the first reference signal for tuning the at least one other of the set of LO generators to an LO frequency as described above with reference to FIGS. 7 through 12. In certain examples, the operations of block 2125 may be performed by the distribution circuit 930 as described with reference to FIG. 9.

Aspects from two or more of the methods 1900, 2000, and 2100 may be combined. It should be noted that the methods 1900, 2000, and 2100 are just example implementations, and that the operations of the methods 1900, 2000, and 2100 may be rearranged or otherwise modified such that other implementations are possible.

The detailed description set forth above in connection with the appended drawings describes examples and does not represent the only examples that may be implemented or that are within the scope of the claims. The term "example" when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A transceiver, comprising:
a plurality of local oscillator (LO) generators configured to generate a plurality of LO signals, respectively, for mixing with one or more communication signals;

a first synthesizer configured to generate a first reference signal;

a second synthesizer configured to generate a second reference signal; and a distribution circuit configured to switch an input to at least one of the LO generators between the first and second reference signals for tuning each of the at least one of the LO generators between two different LO frequencies, and to input to the other ones of the LO generators the first reference signal for tuning each of the other ones of the LO generators to an LO frequency.

2. The transceiver of claim 1, further comprising:
a phase alignment circuit configured to phase align the LO signals generated by the LO generators receiving the first reference signal.

3. The transceiver of claim 2, wherein the phase alignment circuit is further configured to phase align the LO signals generated by the LO generators receiving the second reference signal.

4. The transceiver of claim 1, further comprising:
a phase detection circuit configured to provide a phase control signal to each of the LO generators.

5. The transceiver of claim 4, wherein the phase detection circuit is further configured to generate the phase control signal based on the LO signals.

6. The transceiver of claim 5, wherein the phase detection circuit is further configured to generate the phase control signal based on relative phases of the LO signals generated by the LO generators receiving the first reference signal.

7. The transceiver of claim 6, wherein the at least one of the LO generators comprises two or more LO generators, and wherein the phase detection circuit is further configured to generate the phase control signal based further on relative phases of the LO signals generated by the LO generators receiving the second reference signal.

8. The transceiver of claim 1, wherein the distribution circuit comprises a plurality of serially coupled circuit elements, each of the circuit elements having an output for providing the input to a corresponding one of the LO generators.

9. The transceiver of claim 8, wherein each of the circuit elements comprises a transconductance amplifier.

10. The transceiver of claim 8, wherein the distribution circuit comprises a switching circuit configured to switch the first and second reference signals to one or more of the circuit elements providing the inputs to the at least one of the LO generators.

11. A method of wireless communication, comprising:
generating, at a plurality of local oscillator (LO) generators, a plurality of LO signals for mixing with one or more communication signals;
generating a first reference signal with a first synthesizer;
generating a second reference signal with a second synthesizer;
switching an input to at least one of the plurality of LO generators between the first reference signal and the second reference signal for tuning at least one of the plurality of LO generators between two different LO frequencies; and
inputting, to at least one other of the plurality of LO generators, the first reference signal for tuning the at least one other of the plurality of LO generators to an LO frequency.

12. The method of claim 11, further comprising:
phase aligning the LO signals generated by the LO generators receiving the first reference signal.

13. The method of claim 12, further comprising:
phase aligning the LO signals generated by the LO generators receiving the second reference signal.

14. The method of claim 11, further comprising:
providing a phase control signal to each of the plurality of LO generators.

15. The method of claim 14, further comprising:
generating the phase control signal based on the LO signals.

16. The method of claim 15, further comprising:
generating the phase control signal based on relative phases of the LO signals generated by the LO generators receiving the first reference signal.

17. The method of claim 16, wherein the at least one of the plurality of LO generators comprises two or more LO generators, and further comprising:
generating the phase control signal based further on relative phases of the LO signals generated by the LO generators receiving the second reference signal.

18. The method of claim 11, further comprising:
inputting, to a corresponding LO generator of the plurality of LO generators, an output from at least one of a plurality of serially coupled circuit elements.

19. The method of claim 18, wherein at least one of the circuit elements comprises a transconductance amplifier.

20. The method of claim 18, further comprising:
switching the first reference signal and the second reference signal to one or more of the plurality of serially coupled circuit elements providing the inputs to the at least one of the plurality of LO generators.

21. A wireless communications apparatus, comprising:
a transceiver comprising a plurality of local oscillator (LO) generators configured to generate a plurality of LO signals, respectively, for mixing with one or more communication signals, at least one of the LO generators being switchable between two different LO frequencies, wherein at least two of the LO generators are phase-aligned to mix with the one or more communication signals; and
a processor configured to process a plurality of data packets to provide the one or more communication signals to the LO generators, the processor further being configured to switch the at least one of the LO generators between the two different LO frequencies on a packet-by-packet basis based on information included in each packet.

22. The apparatus of claim 21, wherein the processor is further configured to provide a phase control signal to the plurality of LO generators.

23. The apparatus of claim 22, wherein the processor is further configured to generate the phase control signal based on the LO signals.

24. The apparatus of claim 23, wherein the processor is further configured to generate the phase control signal based on relative phases of the LO signals generated by the LO generators receiving a first reference signal.

25. The apparatus of claim 21, wherein the transceiver further comprises a plurality of serially coupled circuit elements in electronic communication with the plurality of LO generators.

26. The apparatus of claim 25, wherein at least one of the circuit elements comprises a transconductance amplifier.

27. A non-transitory computer-readable medium storing code for wireless communication, the code comprising instructions executable to:
generate a plurality of local oscillator (LO) signals for mixing with one or more communication signals;

generate a first reference signal;

generate a second reference signal;

switch an input to at least one of a plurality of LO generators between the first reference signal and the second reference signal for tuning at least one of the plurality of LO generators between two different LO frequencies; and input, to at least one other of the plurality of LO generators, the first reference signal for tuning the at least one other of the plurality of LO generators to an LO frequency.

28. The non-transitory computer-readable medium of claim 27, wherein the instructions are executable to:

phase align the LO signals of the LO generators receiving the first reference signal.

29. The non-transitory computer-readable medium of claim 28, wherein the instructions are executable to:

phase align the LO signals of the LO generators receiving the second reference signal.

30. The non-transitory computer-readable medium of claim 27, wherein the instructions are executable to:

provide a phase control signal to each of the plurality of LO generators.

\* \* \* \* \*